United States Patent
LeCrone

[19]

[11] Patent Number: 5,913,073
[45] Date of Patent: Jun. 15, 1999

[54] INPUT/OUTPUT DRIVER FOR BENCHMARK TESTING

[75] Inventor: Douglas E. LeCrone, Foxborough, Mass.

[73] Assignee: EMC Corporation, Hopkinton, Mass.

[21] Appl. No.: 08/948,752

[22] Filed: Oct. 10, 1997

[51] Int. Cl.$^6$ .................................................. G06F 11/30
[52] U.S. Cl. .................... 395/835; 395/183.14; 395/568; 395/406; 711/114
[58] Field of Search ................................... 395/828–839, 395/183.13, 183.14, 184.01, 184.14, 568, 708, 406, 673; 711/114

[56] References Cited

U.S. PATENT DOCUMENTS

| | | | |
|---|---|---|---|
| 4,807,111 | 2/1989 | Cohen et al. | 395/874 |
| 5,088,058 | 2/1992 | Salsburg | 364/578 |
| 5,206,939 | 4/1993 | Yanai et al. | 711/4 |
| 5,333,319 | 7/1994 | Silen | 395/673 |
| 5,446,855 | 8/1995 | Dang et al. | 711/1 |
| 5,506,986 | 4/1996 | Healy | 707/204 |
| 5,515,525 | 5/1996 | Grynberg et al. | 395/500 |
| 5,530,897 | 6/1996 | Meritt | 395/829 |
| 5,530,948 | 6/1996 | Islam | 395/182.04 |
| 5,557,740 | 9/1996 | Johnson et al. | 395/184.14 |
| 5,572,672 | 11/1996 | Dewitt et al. | 395/184.01 |
| 5,671,439 | 9/1997 | Klein et al. | 395/821 |
| 5,671,442 | 9/1997 | Feeney et al. | 395/834 |
| 5,754,887 | 5/1998 | Damron et al. | 395/858 |
| 5,819,112 | 10/1998 | Kusters | 395/856 |
| 5,826,090 | 10/1998 | Mealey et al. | 395/712 |

*Primary Examiner*—Christopher B. Shin
*Attorney, Agent, or Firm*—Pearson & Pearson

[57] ABSTRACT

A benchmark testing system for evaluating the performance of large capacity disk storage systems with multiple disk controllers operating under a main operating system. The benchmark test utilizes a number of modules that establishes a pseudo-operating system having a dispatcher queue, I/O request objects and a request generator. The request generator selects an available I/O request object from a pool and transfers it to the dispatch queue. An inactive driver responds by making the I/O request object available as a task for the main operating system. When the transfer is complete, a driver effects the removal of the I/O request object from the dispatch queue. The maximum number of drivers, and hence the maximum number of tasks that can be provided to the MVS system, is established the number of central processors in the system.

24 Claims, 17 Drawing Sheets

INPUT/OUTPUT DRIVER FOR BENCHMARK TESTING

BACKGROUND OF THE INVENTION

1. Field of the Invention

This invention generally relates to data processing systems and more specifically to a method for obtaining quantitative analyses of the operation of input/output devices.

2. Description of Related Art

Large data processing systems often include multiple central processors and a large primary mass storage device, typically a direct access storage device (DASD). Applications that run on such systems demand high performance, particularly input/output (I/O) transfer rates that include transferring to and from the direct access storage device. As I/O transfer rate requirements become more demanding, DASD manufacturers strive to improve performance by altering hardware and control designs. Given the sophistication of current DASD architecture, it becomes highly advantageous to pretest prototype systems using such design modifications by means of various benchmark testing procedures to evaluate the overall impact of a design change on overall performance. This has led to the development of evaluation or benchmark methods.

United States Letters Patent No. 5,088,058 to Salsburg, for example, discloses an apparatus and method for evaluating and predicting computer I/O performance using I/O work load snapshots for a model input. The evaluation and prediction is based upon a simulation model that contains a stack constructed such that delays are formulated as sets of stochastic processes. The simulation model includes at least one statistical sub-model and has delay parameters that are settable in accordance with a selectable I/O disk configuration. A selectable I/O work load snapshot grouped into I/O batches drives the simulation model that then provides both overall and batch output data in response to the I/O work load snapshot. In addition, the simulation model takes into account the presence of cache storage in the selected I/O configuration.

While the foregoing evaluation method predicts I/O rates, it is even more important to quantify the effect of different designs on actual I/O rates. The methods for making actual measurements during such an evaluation are very important, particularly in large systems such as IBM based systems utilizing the multiple virtual storage (MVS) concept. However, the measurements can become difficult to implement, primarily because the MVS system can establish hundreds of address spaces for different applications that produce data transfers by means of an I/O subsystem that relies upon a task control block (TCB) and a supervisory request block (SRB) with a requirement that contention among the blocks be resolved before an associated task or source can be processed.

One prior art approach to obtaining an I/O benchmark in an MVS-based system has been to generate independent I/O operations in each device in a direct access storage device, such as a Symmetrix Series 5500 integrated cached disk array available from the assignee of this invention. In such an integrated cached disk array a "device" is a "logical volume". In the context of MVS an I/O benchmark test for such a cached disk array uses one TCB per device. Conventional MVS systems serialize any contentions by such processes for common locks that are in an MVS address space. This is a serialization process that prevents one process running under one TCB from running until a previously selected process running under another TCB in that address space has been completed. At normal input/output rates with a few devices the overhead introduced by the time required to resolve the contentions represented by multiple lock/unlock operations is small in comparison with the interval between I/O operations.

Certain DASD architectures, such as the Symmetrix Series 5500 integrated cached disk array architecture, can build large capacity memories for many small disk controllers and associated physical disk drives configured into 100 or more logical volumes, or devices. However, it has been found that when more than thirty-two separate devices are involved, the time required for the MVS system to resolve contentions for access to an address space by processes running under corresponding task control blocks becomes significant in comparison with I/O times. The resulting delays required to resolve contentions can skew results so the benchmark test does not provide reliable measurements. This problem is exacerbated as the number of devices increases beyond thirty-two as the time to resolve contention varies as the square of the number of devices. As a result, the prior art tends to impose a limit of 32 devices, or whatever the maximum number that can be accommodated by the I/O benchmark without unacceptable delay. If the total number of devices exceeds such a maximum, unacceptable delays are avoided by running multiple copies of the benchmark in parallel in different address spaces. For example, if the integrated cached disk array contains 128 logical volumes or devices, four copies of the I/O benchmark will run in parallel under the MVS operating system thereby to assure the maximum acceptable TCB count in a single address space. Such parallel operations introduce further complexities in the benchmark than can detract from objectives of the benchmark.

SUMMARY

Therefore it is an object of this invention to provide an improved method for evaluating input/output operations in a data processing system.

Another object of this invention is to provide a method for evaluating input/output operations in a data processing system that minimizes the overhead imposed by benchmark tests.

Yet another object of this invention is to provide an improved testing method for evaluating the input/output operations of a data processing system that provides more accurate quantitative evaluation of performance at high input/output rates with large numbers of input/output devices.

Quantitative analysis of the operation of an input/output system in accordance with this invention is obtained through benchmark tests that initiate an input/output operation by transferring an input/output request to a dispatcher queue associated with the benchmark test and then using one of a plurality of drivers that individually are characterized by having an active or inactive state. During the benchmark a series of input/output requests are generated in a sequence. In response to each I/O request, an inactive request is changed to an active state and placed on the dispatch queue. An inactive driver is selected and responds by initiating a transfer with the designated input/output device. The selected driver status then reverts to an inactive state so the driver is available for use in response to the generation of a subsequent input/output request. The number of drivers in the system is dependent upon the number of central processors, not the number of devices.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

In essence this invention enables benchmark tests of input/output devices at very high input/output rates without the introduction of significant overhead even when the tests involve large numbers of input/output devices. This end has been realized by the generation of a separate pseudo-operating system that itself does not impose any delay that is significant in the time scale of input/output operations, such as reading data from or writing data to a disk storage device and that minimizes overhead introduced by the serialization of tasks required by the conventional operating systems.

In accordance with this invention, minimizing overhead is achieved by establishing within the pseudo-operating system a dispatcher queue and drivers for interfacing between this dispatcher queue and transferring an input/output request for input/output operations to an MVS or other main operating system dispatcher queue or mechanism. The number of drivers is limited to a number dependent upon the number of the central processors in a system. This number is less than sixteen and normally 8 or 9, and the number of task control blocks is invariant with the number of controllers or devices. Consequently, the overhead time required for resolving contentions in connection with the transfers by the MVS main operating system is reduced significantly. For example, in an MVS system environment each driver has an associated task control block (TCB). Reducing the number of task control blocks from 32 to 8 reduces significantly the maximum time required for the MVS operating system to resolve contention among competing task control blocks. This reduction further eliminates any need for running parallel benchmarks to maintain the 32-task-control-block maximum of the prior art.

This invention can take many forms. However, it is perhaps best understood by referring to one specific conventional operating system and describing the necessary data structures and processes in terms of that specific operating system. Given the populations of different systems, this invention is described in terms of a system including multiple IBM central processors and a Symmetrix Series 5500 integrated cached disk array running under the IBM MVS operating system.

Figure 1:
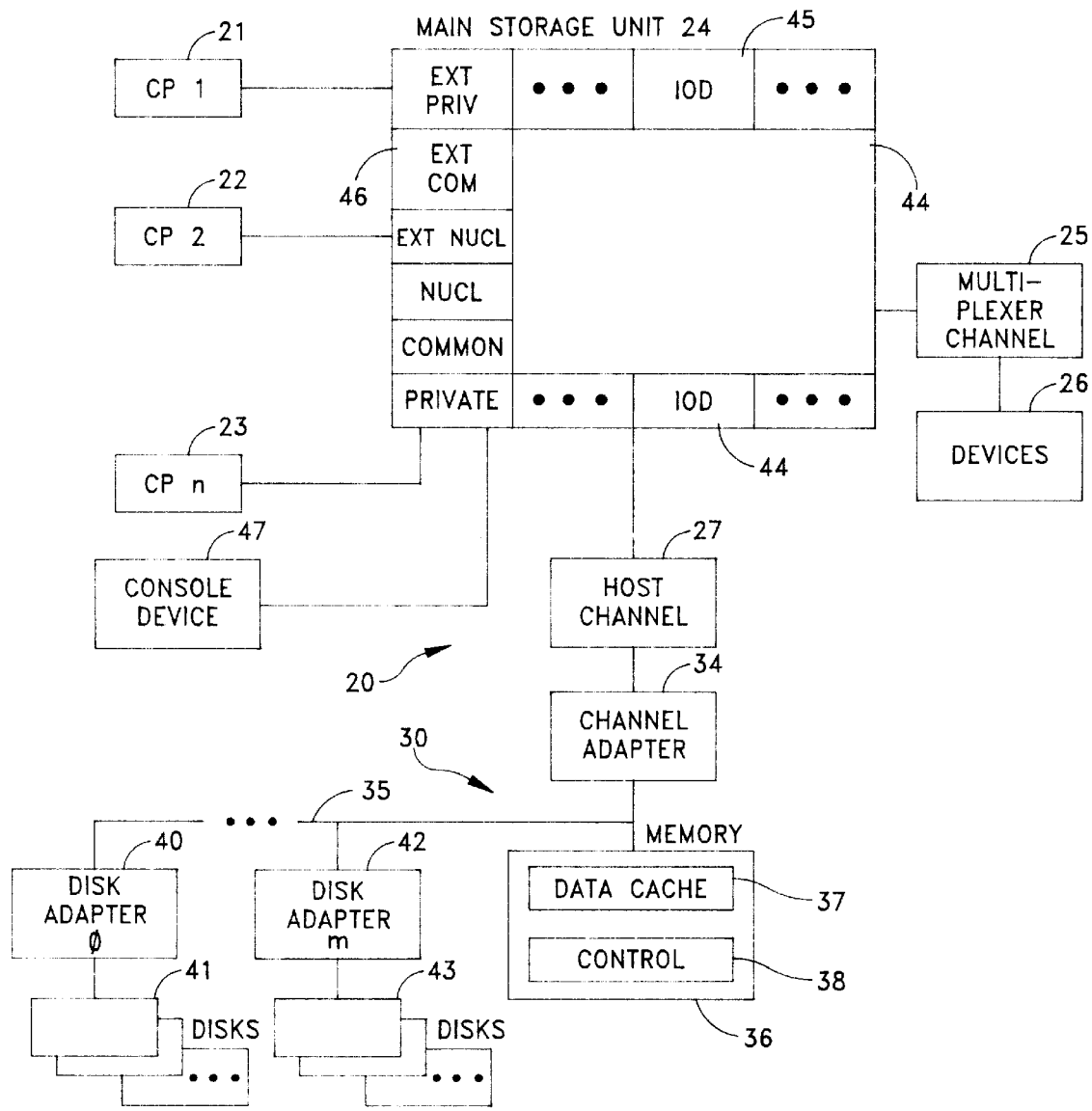
FIG. 1 is a block diagram of a data processing system adapted for using this invention.

FIG. 1 depicts such an IBM based system 20 in a form useful for understanding this invention. The system 20 comprises multiple central processors (CP) identified as CP1 21, CP2 22 and CPn 23 wherein n is the maximum number of central processors that comprise the data processing system. Each central processor connects to the main storage unit 24. The main storage unit 24, when operating in an IBM MVS environment, is divided into a number of sections, as known, that include private, common, nucleus, extended nucleus, extended common and extended private storage areas.

A multiplexer channel 25 provides a communications path for devices 26 such as printers, local terminals and the like. Another multiplexer channel acts as a host channel 27 and provides a communications path to a direct access storage device (DASD) or primary storage device 30.

U.S. Pat. No. 5,206,939 of Moshe Yanai et al. for a System and Method for Disk Mapping and Data Retrieval and assigned to the same assignee as this invention describes such a storage device 30 that is commercially available as a Symmetrix Series 5500 integrated cached disk array. The components include a channel, or host, adapter 34 that connects to a communications channel, such as the host channel 27. A bus 35 connects to a cache memory 36 that includes a data cache portion 37 and a control portion 38. A disk adapter 40 connects to the bus 35 and to a plurality of disks 41; another disk adapter 42, to disks 43. A single physical integrated cached disk array 30 such as shown in FIG. 1 may comprise up to 128 physical disk drives, or disks, that may be divided into one or more logical volumes. In the context of this invention, the benchmark will monitor I/O operations occurring in each of these logical volumes, than can number in the hundreds in a single disk array.

In the Symmetrix Series 5500 integrated cached disk array input/output operations include reading and writing operations. Writing operations produce a transfer into the data cache 37. Control programs in the control portion 38 then effect the transfer from the data cache 37 to a logical volume on one of the pluralities of disks 41 and 43. Reading operations are accomplished by first determining whether the requested data is available in the data cache 37. If it is not, the requested information transfers from one logical volume on the pluralities of disks 41 and 43 to the data cache 37 for subsequent transfer to the main storage 24.

In accordance with this invention, the programs and data structures for performing the benchmarks with such a disk array are designated as an "IOD" application that will generally be located by the MVS operating system in private and extended private areas 44 and 45. As described later, the IOD system is a pseudo-operating system that runs under and integrates operations with the MVS operating system. The MVS operating system is well known in the art.

One portion of the IOD system is a communications module, called an IODSSM module in the following description, located in a common extended area 46 to enable communications between the IOD system and a system console 47. Once operating, commands entered at the system console 47 initiate various operations that, in turn, establish parameters for and execute the benchmark. When the IOD system in areas 44 and 45 runs, it produces requests for input/output operations. The MVS program then controls, schedules and effects, through different ones of the CP's 21, 22, 23 and others, actual I/O operations with designated disk adapters, such as disk adapters 40 or 42 and related pluralities of disks 41 and 43.

Figure 2:
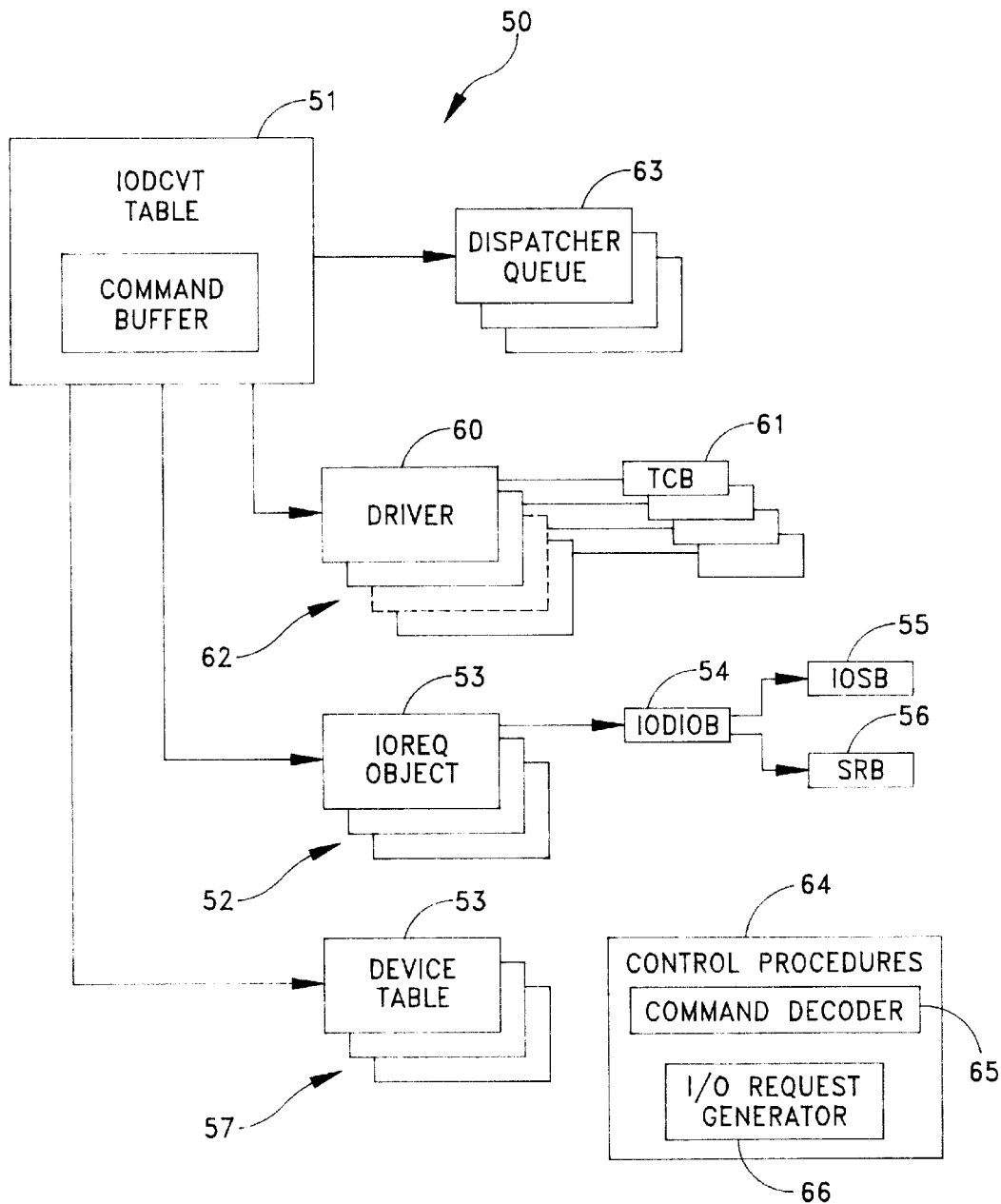
FIG. 2 is a block diagram that depicts the organization of an input/output driver constructed in accordance with this invention.

The IOD system in areas 44 and 45 of FIG. 1 is collectively identified as an IOD system 50 in FIG. 2. The main control block in the IOD system 50 is an IODCVT table 51 that is analogous to a Communication Vector Table (CVT) table used in MVS operating systems. This is a primary control block from which any other control block in the IOD system 50 can be reached. For example the IODCVT table 51 includes an entry that points to an IOREQ pool 52 that comprises some number of IOREQ objects 53 generally formed in contiguous locations as I/O request structures or blocks. Each request object 53 includes a pointer to a local IOB block 54 (called an IODIOB block to distinguish it from an IOB block used in an MVS operating system) which in turn points to an IOSB (input/output supervisory block) 55 and an SRB (supervisory request block) 56.

The IODCVT table 51 pointer identifies the first IOREQ object 53 in the IOREQ pool 52. Each IOREQ object 53 contains a pointer to a next IOREQ object in sequence. Intermediate IOREQ objects also contain a pointer to the previous IOREQ object.

A device table pool 57 comprises a plurality of device tables 58 for individual devices. Each table has an address that is included in a device table pool 57. The IODCVT 51 table points to the device table pool 57. There will be one device table 58 for each device (i.e., logical volume).

FIG. 2 also depicts a plurality of drivers, each with a corresponding task control block (TCB), a driver 60 with an associated TCB block being specifically identified in FIG. 2. The plurality of drivers and corresponding TCB's constitute a driver pool 62 located through the IODCVT 51. As previously stated the number of drivers in the pool 62 is determined by the number of CP's in the data processing system. In the specific example of FIG. 1 the data processing system 20 contains three CP's 21 through 23, so the driver pool 62 comprises four drivers and associated TCB's. Fewer drivers can be included in the driver pool 62 without detracting from overall performance in many environments.

The IOD system 50 also contains a number of control procedures 64 that include a user command decoder 65 and an I/O request generator 66.

For the specifically implemented embodiment of this invention an election has been made as to an organization of various functions into a number of modules that establish the environment for the benchmark test and effect that test. As an introduction, a major module is an IODCOMM module shown in FIGS. 3A through 3D. This module enables communications between commands received from the console device 47 in FIG. 1 and other system modules. The IODCOMM module initializes the system and uses an IODINIT module in FIG. 4 to establish various data structures shown in FIG. 2 to include the driver pool 62 with its drivers and associated task control blocks 61. An IODSSMI module in FIG. 5 establishes an environment for an IODSSM module of FIG. 6 that is stored in the common extended area 46 of the main storage unit 24 as shown in FIG. 1. The IODSSMI and IODSSM modules in FIGS. 5 and 6 enable an operator to control the system through the console device 47 in FIG. 1.

Once the initialization has been completed, the IODCOMM module in FIGS. 3A through 3D awaits for activity in the form of a request from the console device 47.

Figure 7:
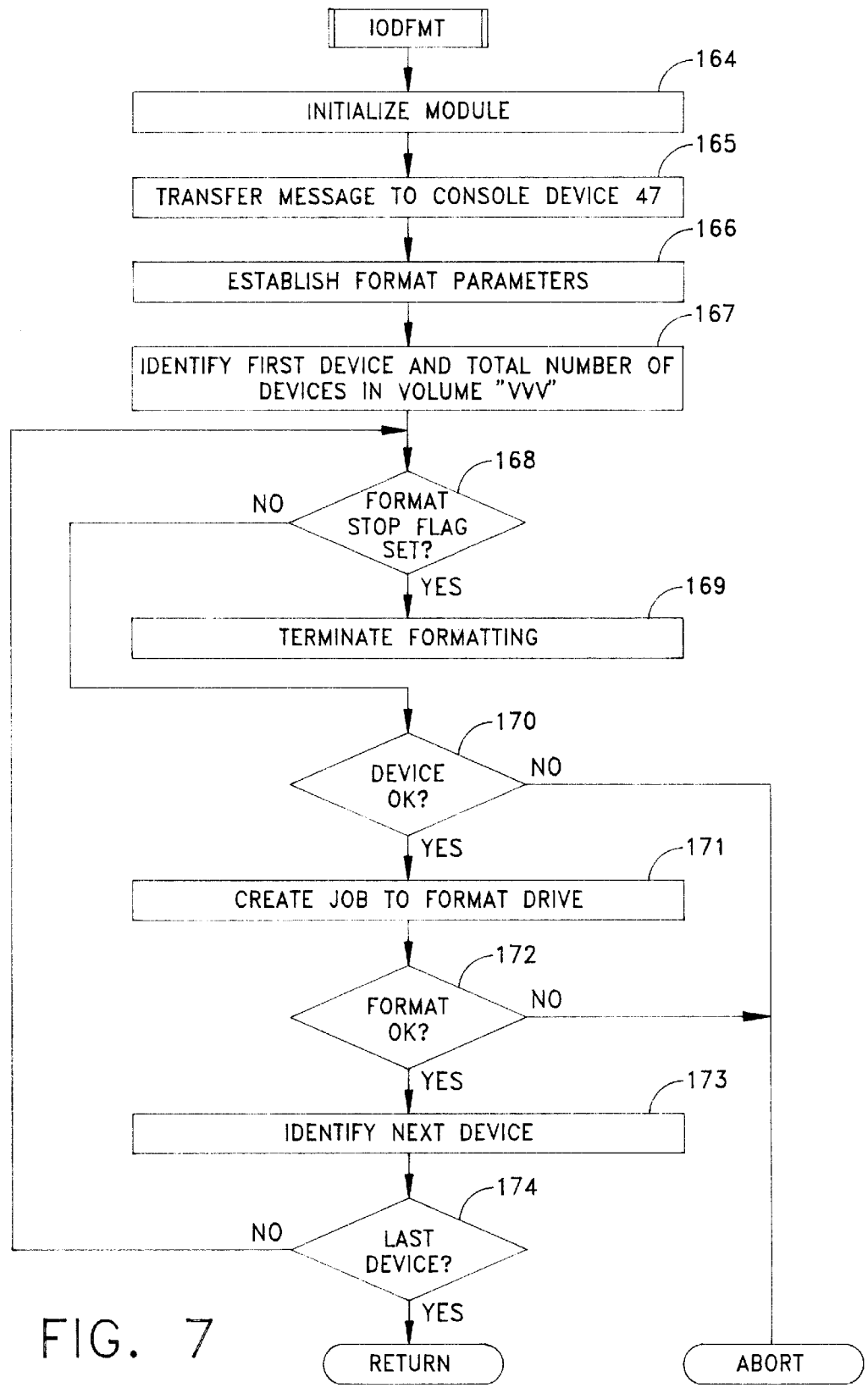
FIG. 7 is a flow diagram of a format program generated in response to the FORMAT command shown in FIG. 6C.
Figure 8:
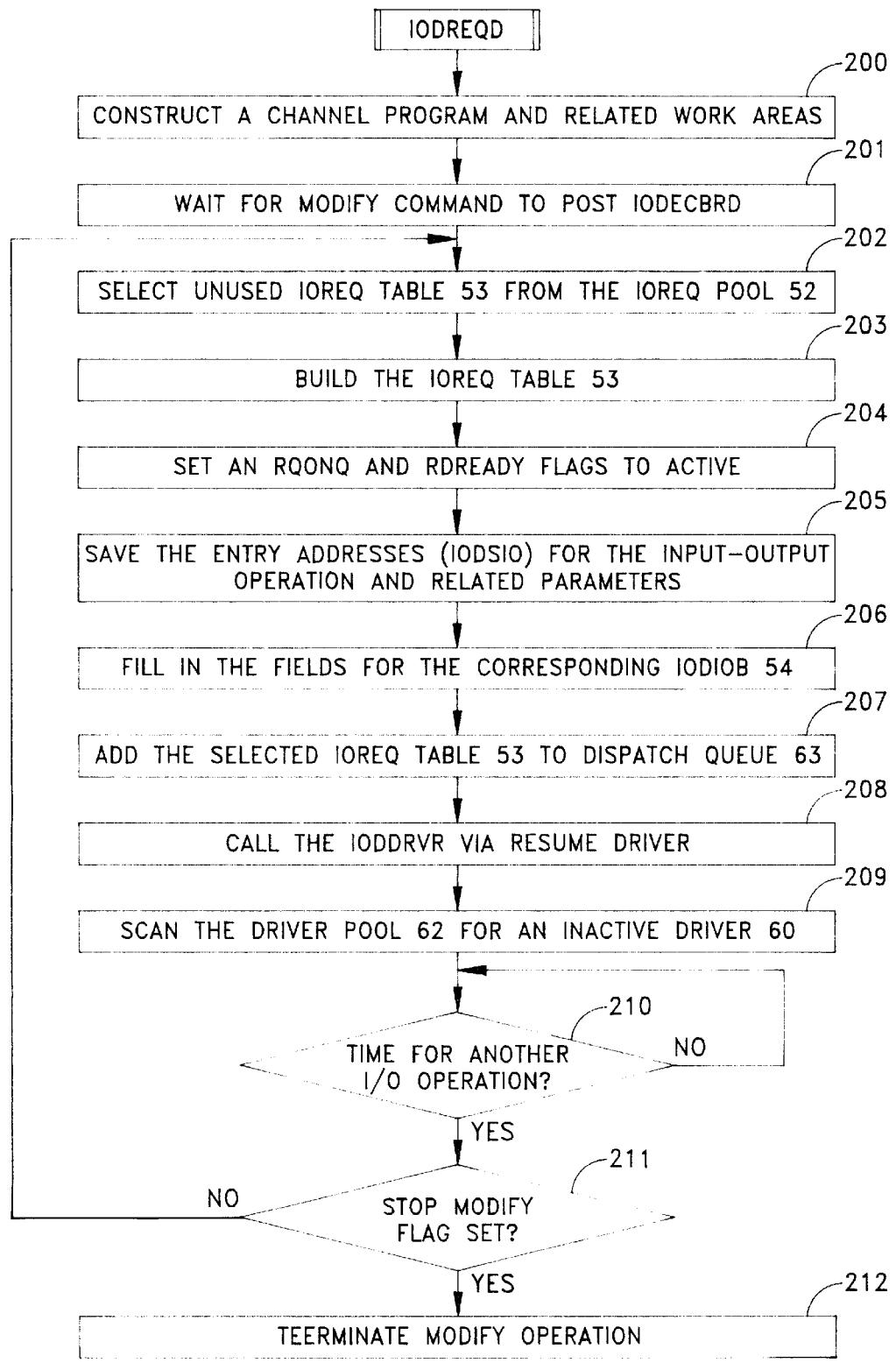
FIG. 8 is a flow diagram of a request handling program.

The IODCOMM module then decodes any such communications to add controllers for the test, to format a particular disk utilizing an IODFMT module of FIG. 7 and to initiate a particular test by establishing the posting of a particular command that then enables an IODREQD module of FIG. 8 to generate a request that is places on a dispatcher queue 63. An IODDRVR module of FIGS. 9A through 9C operates under its task control block to initiate a transfer. The MVS operating system responds by effecting the transfer of the requested data with the storage device 30. When that operation is complete, the IOD system 50 responds to a notice from the MVS operating system by using an IODPOSTX module in FIG. 11 to complete the operation and return the request from the dispatcher queue 63 to the IOREQ pool 52 for use in another transfer.

Figure 9A:
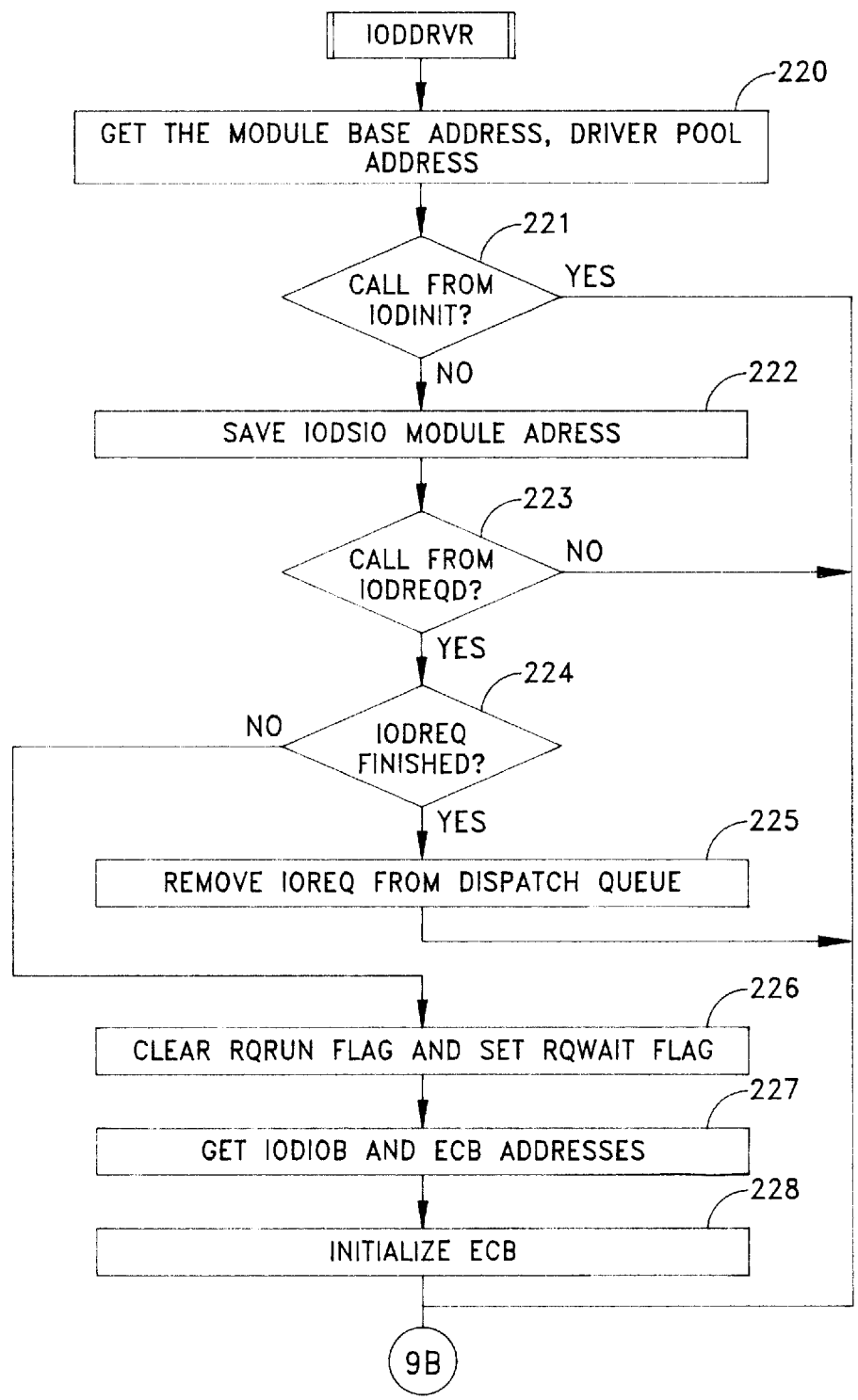
FIGS. 9A through 9C constitute a flow diagram of a driver program.
Figure 9B:
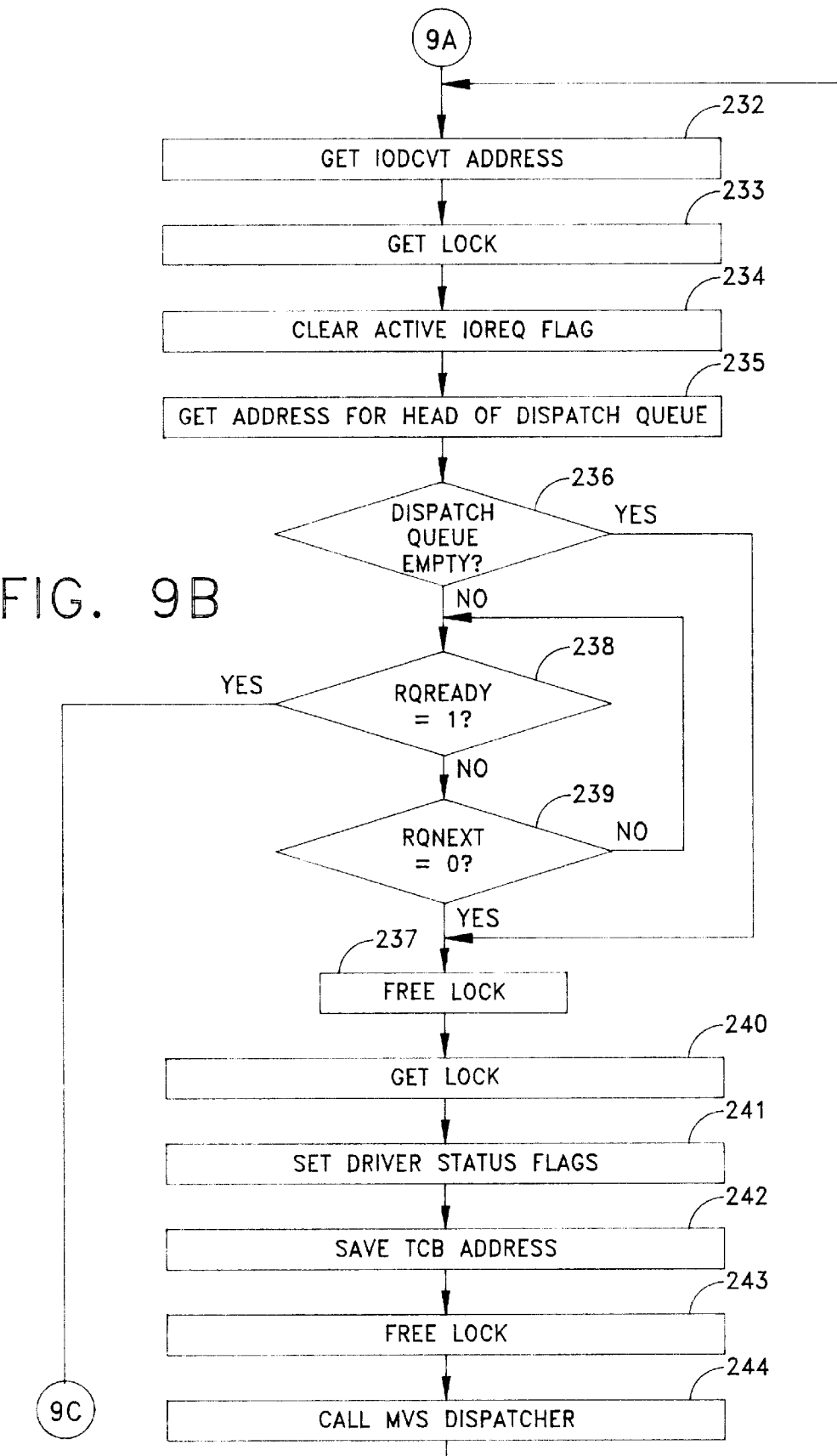
Figure 9C:
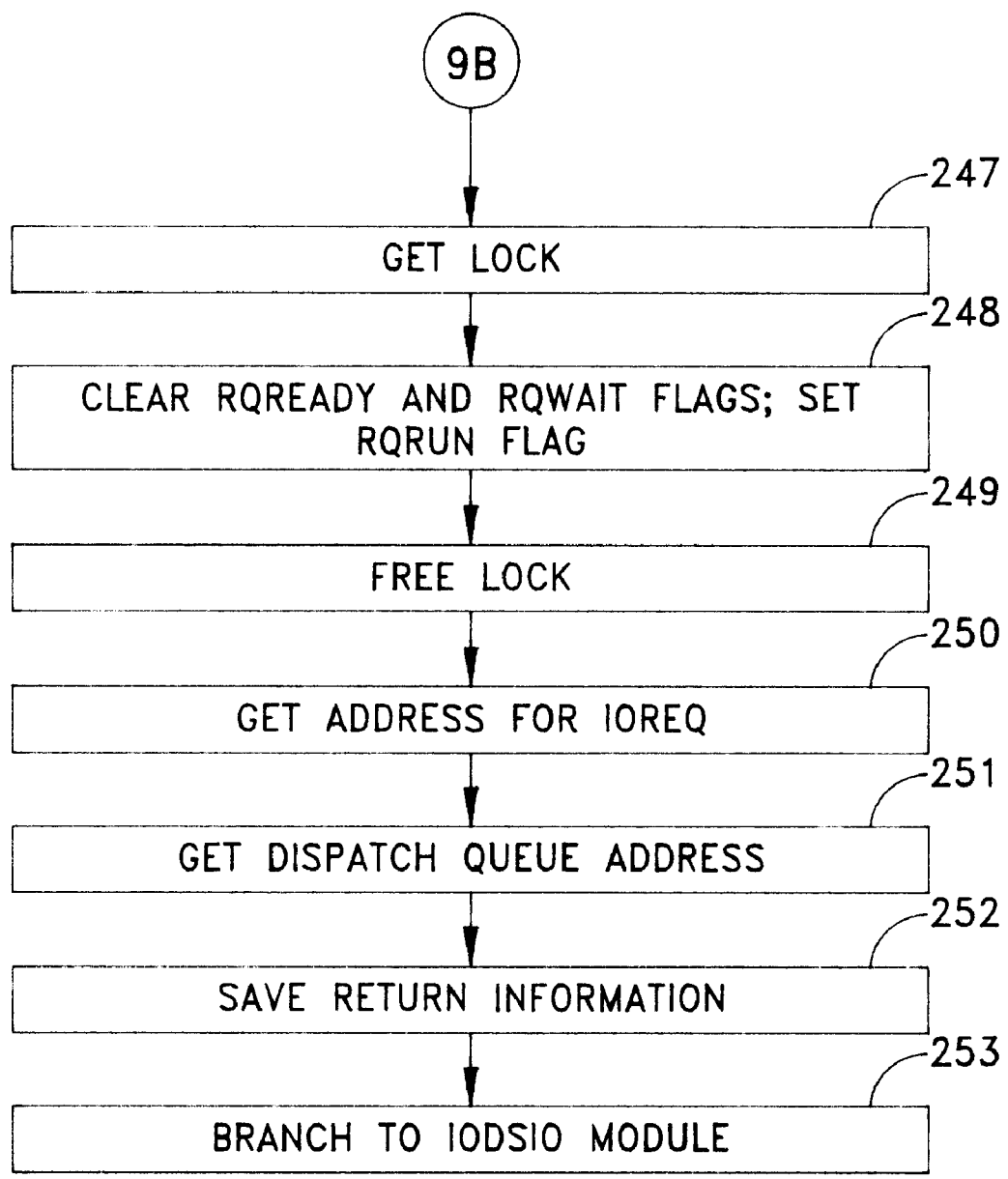

As will become apparent, the IODDRVR module in FIGS. 9A through 9C also becomes active at other times during the operation so that each driver is only active for a short interval of time. That is, no specific driver is dedicated to a single request for the duration of the input/output operation in response to the request.

SPECIFIC DESCRIPTION
IODCOMM AND RELATED MODULES

The IODCOMM module 100 shown in FIGS. 3A through 3D, first initiated under an MVS operating system JOB TCB, uses step 101 to establish various registers, address bases and recovery procedures for use in the IOD system. These and other steps will not be described with any specificity because the procedures are well known to persons of ordinary skill in the art and because the specific registers, address base and recovery procedures will be apparent from the context of this invention.

Figure 3A:
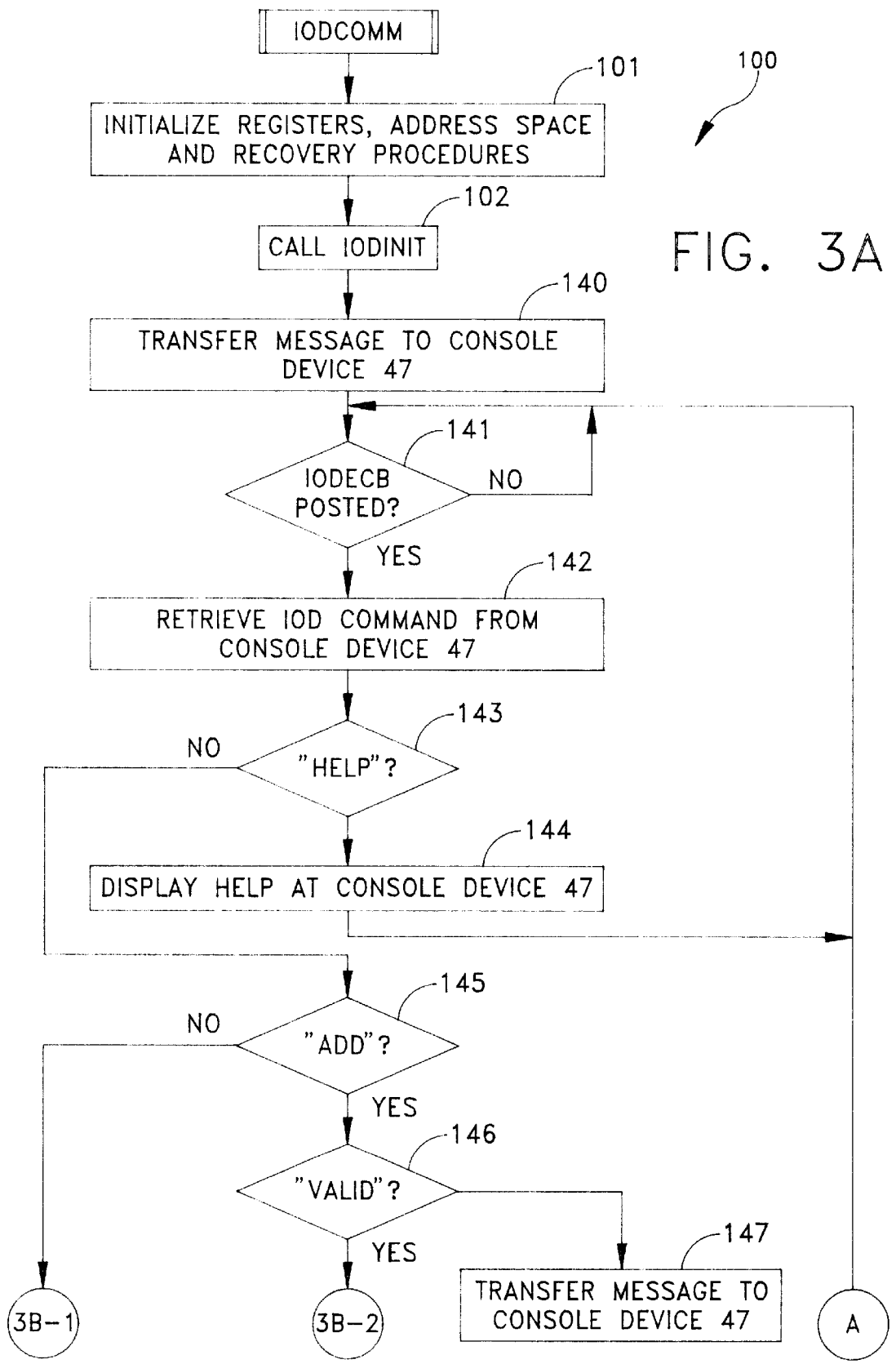
FIGS. 3A through 3D depict a flow diagram of a communications program.
Figure 4:
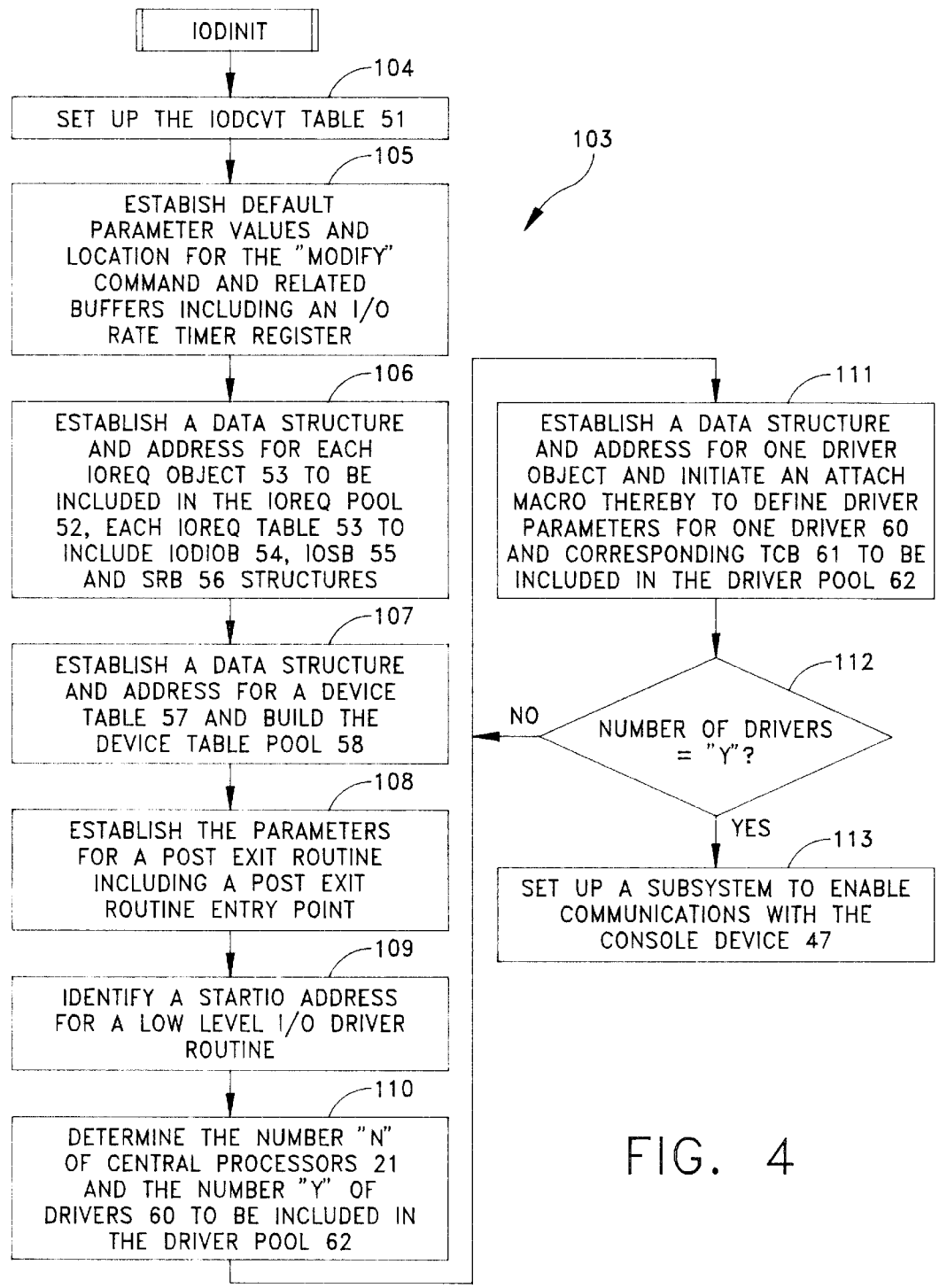
FIG. 4 is a flow diagram depicting an initialization program called by a step in FIG. 3A.

Step 102 in FIG. 3A then calls the IODINIT module 103 in FIG. 4 wherein step 104 sets up the IODCVT table 51. Step 105 establishes various default parameter values and locations for a "MODIFY" command and related buffers including an I/O rate timer register. The MODIFY command parameters establish the I/O rate, I/O rate changes and the ratio of read and write operations.

Step 106 establishes a data structure and address for each IOREQ object 53 to be included in the IOREQ pool 52. As previously indicated, each IOREQ object 53 will include an IODIOB structure 54, an IOSB 55 and SRB 56. The exact number of IOREQ objects is arbitrary. Each object is dedicated to a particular I/O transfer for the duration of the transfer. Therefore the maximum number should be selected so that there will be an IOREQ object available for each request at the maximum requested rate.

Step 107 establishes the data structure and address for the device table pool 57 and its individual device tables 58. Step 108 establishes the parameters for the post exit routine or module in FIG. 11 and a post exit routine entry point for the purposes of which will become apparent later. Step 109 identifies a start I/O address for a low level I/O driver routine incorporated in the IODSIO module in FIG. 10. Step 110 determines that the number "N" of central processors 21 and the number "Y" of drivers 60 to be included in the driver pool 62. In accordance with this invention the number "Y" relates to the number of central processors and not to the number of devices. It has been found that if Y=N+1 the Y drivers can respond to requests for I/O operations on the dispatcher queue 63 by initiating the actual requested data transfer at any possible request repetitive rate. However, adequate benchmark tests can also be conducted with Y=N, Y=N−1 . . . Y=2. Given the relatively small memory requirements for storing each driver 60, it is anticipated that normally for maximum reliability and flexibility that Y=N+1.

Once "Y" has been determined, step 111 establishes a data structure and address for one driver by performing an ATTACH macro that creates a new task in the MVS operating system environment. This task then indicates an entry point in the driver that will be given control wherever the corresponding task becomes active. The ATTACH macro is a conventional MVS utility. Step 112 represents a test that controls the number of drivers. When the data structures and addresses for each driver have been generated, step 112 diverts to step 113 that enables the subsystem to communicate with the console device 47 by transferring control to the IODSSMI and IODSSM modules of FIGS. 5 and 6.

Figure 5:
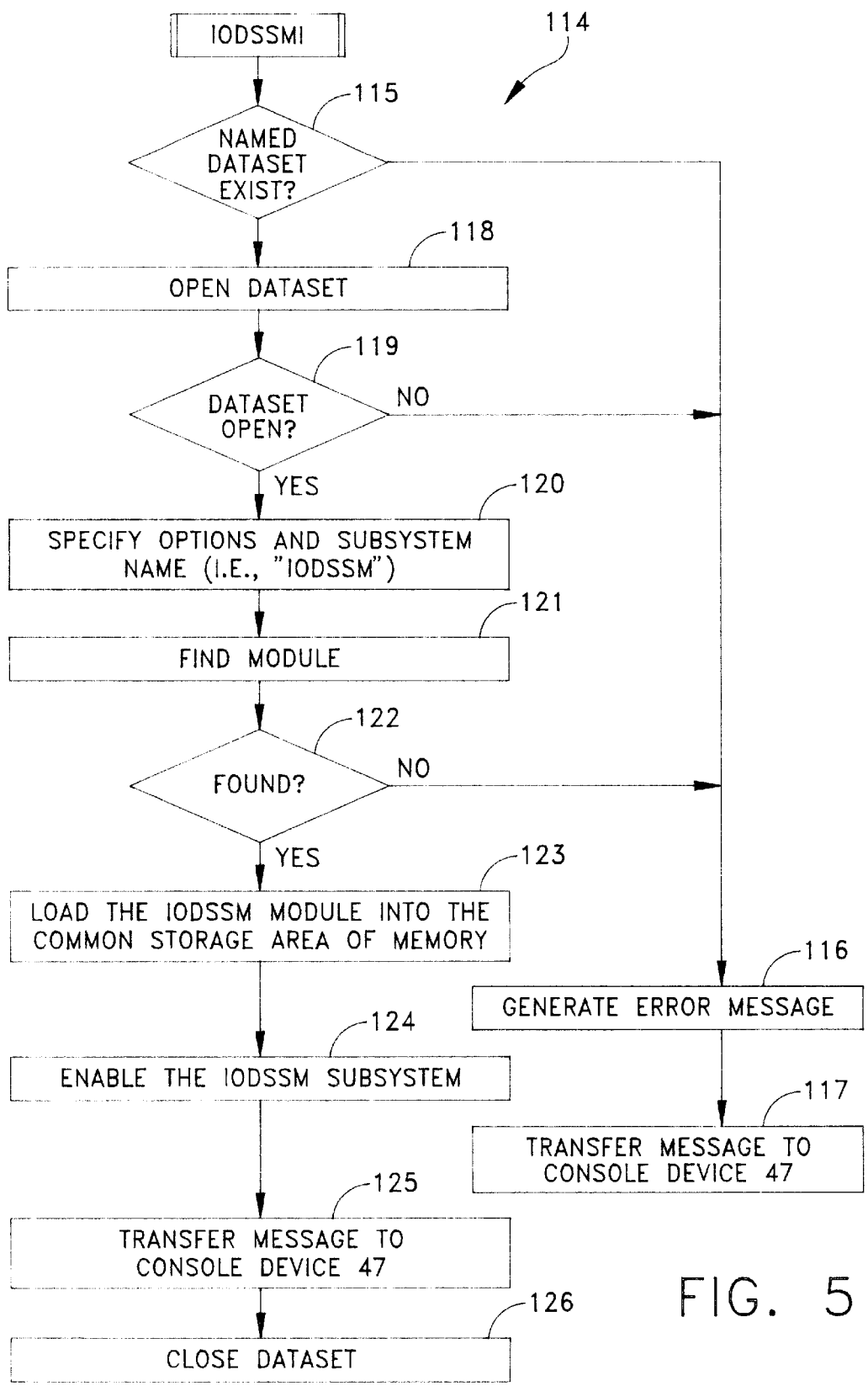
FIG. 5 is a flow diagram of a subsystem initialization program.

The IODSSMI module 114 shown in FIG. 5 determines whether the named data set or application is present in the address space. This data set is an MVS data set that enables the console device 47 to communicate through the MVS system to an application. If it is not, control diverts from step 115 to step 116 to generate an error message that transfers to the console device 47. Operations then terminate.

Assuming the data set exists, step 115 diverts to step 118 to open the data set. Step 119 tests to assure that the data set opened correctly. If it did, step 120 specifies various options and the subsystem name, namely the IODSSM module name, in step 120. The IODSSMI module 114 then attempts to find the IODSSM module in step 121. If found, step 122 transfers control to step 123 to load the IODSSM module into the common storage area of the main storage area 24 in FIG. 1. Thereafter step 125 transfers a message to the console device 47 and the data set is then closed. If the data set does not open properly or the IODSSM module is not found, step 119 or step 122, respectively, branches to generate an appropriate error message in step 116 for transfer to the console device 47 in step 117.

Figure 6:
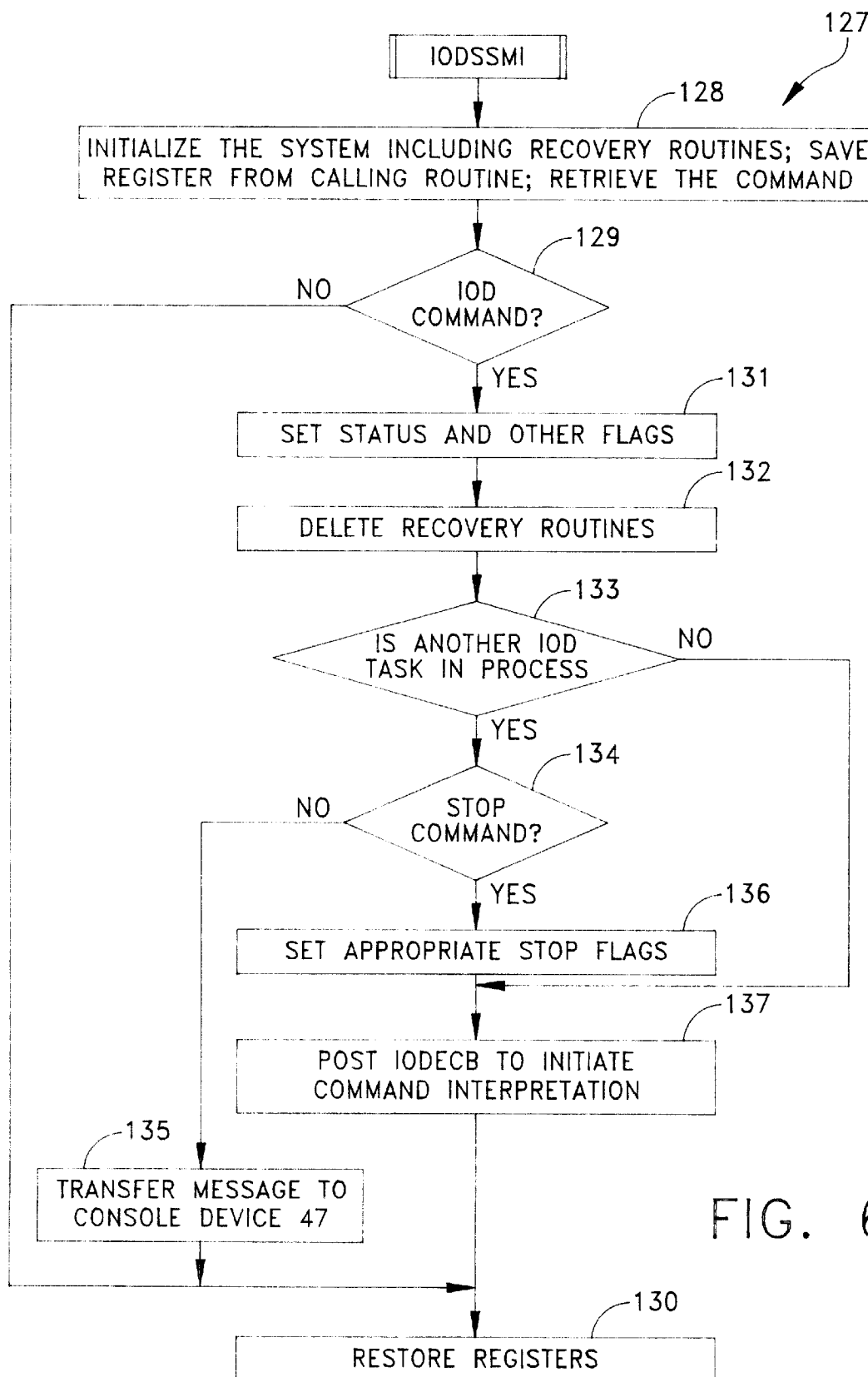
FIG. 6 is a flow diagram of a subsystem program.

Assuming, however, that the IODSSM module is found, step 124 enables the IODSSM subsystem in FIG. 6 to operate in response to certain commands, called IOD system commands, from the system console device 47. The IODSSM module 127 shown in FIG. 6 initializes by including any recovery routines, by saving registers from a calling routine and by retrieving commands in step 128. As will be apparent, the console device 47 can generate any number of commands for other activities. Step 129 in FIG. 6 decodes the command to determine if it is an "IOD" command; that is, a command that will be recognized by the IOD system 50. If it is not an IOD command, step 129 branches to step 130 to restore registers. If it is, step 129 diverts to step 131 to set status and other flags. Any recovery routines can then be deleted in step 132.

Generally if another IOD task is in process an error condition exists. There are two exceptions. It is possible to issue a command to stop formatting and to stop a benchmark while a formatting or benchmark operation is in process. Step 133 diverts to step 134 to test for those exceptions if another IOD task is in process. If the command is not one of the exceptions control branches to step 135 that generates a message for transfer to the console device 47 indicating an error condition. If no other IOD task is in process or if the other IOD process is one of the exceptions, control transfers to step 136 that posts an IODECB to initiate command interpretation and sets an appropriate flag such as a Format Stop flag or a Modify Stop flag. Thereafter step 130 restores the registers and the IODSSM program ends and control transfers back through the IODSSMI module in FIG. 5 and the IODINIT module in FIG. 4 to step 140 in FIG. 3A.

Referring to FIG. 3A, step 140 produces a message on the console device 47 indicating to the operator that initialization has been satisfactorily completed. Control passes to step 141 to wait for the posting of an IODECB message. As previously indicated, when an IOD system command is entered at the console device 47, step 137 in FIG. 6 will post an IODECB. Whenever an IODECB is posted, step 141 in FIG. 3A transfers to step 142 that transfers another message to the console device 47 to retrieve the IOD system command.

The balance of FIGS. 3A through 3D represent a process of decoding the various IOD system commands. For example, step 143 decodes an IOD system HELP command and step 144 displays a help message at the console device 47. Transfer then returns to step 141 to await the next posting of an IODECB.

ADD IOD SYSTEM COMMAND

An "ADD vvv" IOD system command establishes communications between the IOD system 50 and a specific volume to be tested.

The "vvv" argument or parameter identifies all on-line devices with a volume serial number starting with "vvv". If an operator enters an ADD command, step 145 decodes that command. Step 146 then validates the syntax of the command. If any error exists step 147 transfers an error message to the console device 47 and control returns to step 141.

Figure 3B:
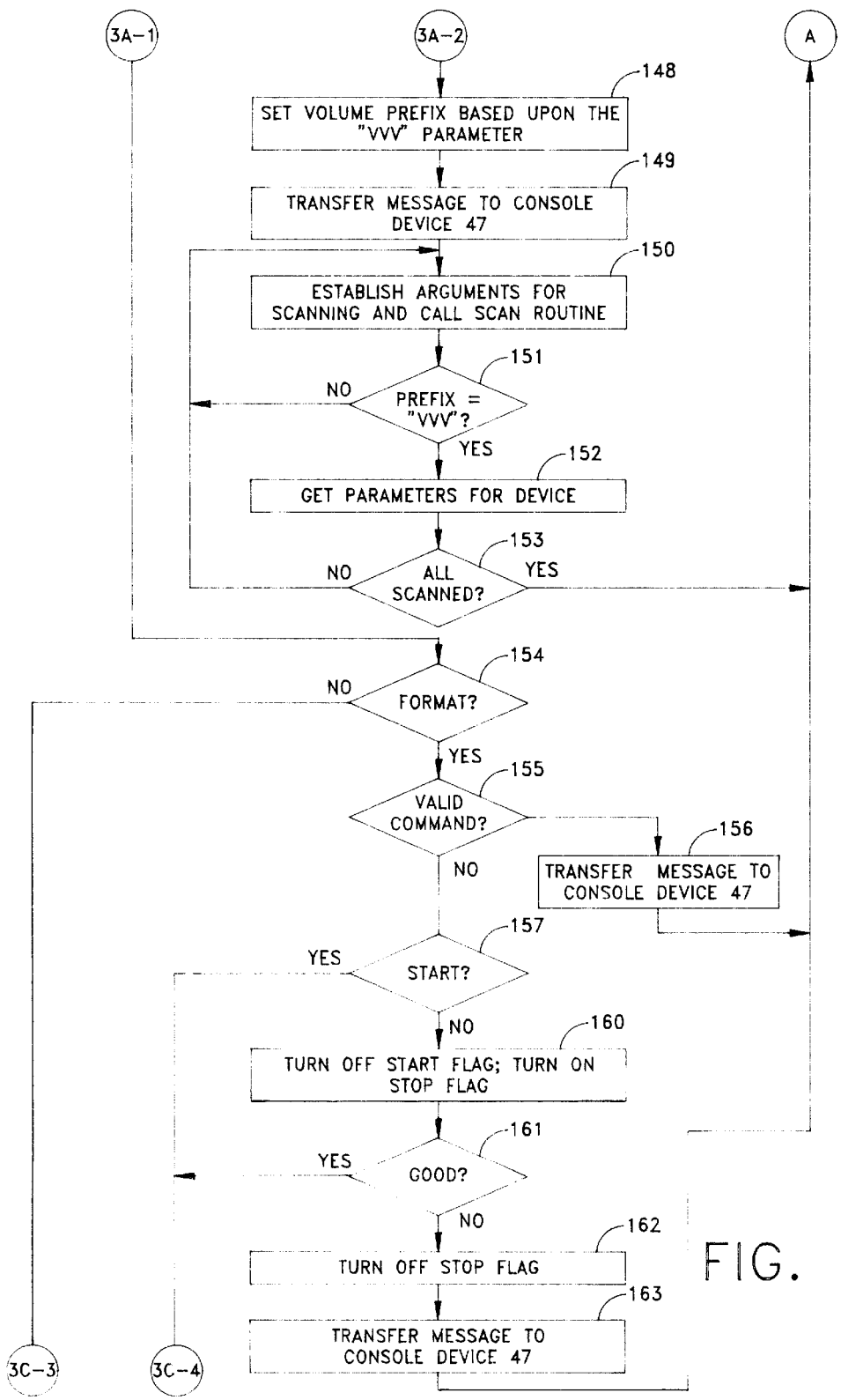

Assuming that the received ADD command has valid syntax, step 146 transfers control to step 148 in FIG. 3B wherein the volume prefix is set based upon the "vvv" parameter supplied with the command. A message again is sent to the console device 47 in step 149 to identify that the ADD process has begun.

Step 150 is a first step in a loop that establishes various arguments for scanning and a scan routine examines each device or controller in the system. If a device is found with the prefix "vvv", control shifts from step 151 to step 152 that retrieves the parameters for the device, these parameters then being incorporated in a device table 58 in FIG. 2. Step 153 in FIG. 3B then determines whether all the devices have been scanned. If they have not, control loops back to step 150. When this loop completely tests every device in the system, step 153 transfers control back to step 141 in FIG. 3A. As a result of this IOD system command, the device pool 57 in FIG. 2 has been constructed with a device table 58 for each device.

FORMAT IOD SYSTEM CONTROLLER

The benchmark test presumes that a particular format exists on the disks. If it is necessary to modify the disk to obtain that format, the operator can generate a FORMAT command that has one of two arguments, namely a START argument or a STOP argument. The various parameters of formatting can be established as default values within the IOD system 50 of FIG. 2. When step 154 decodes a FORMAT command, step 155 determines whether the command is valid. If it is not, step 156 transfers an appropriate message to the console device 47 and control returns to step 141 in FIG. 3A. Otherwise step 157 determines whether the FORMAT command includes a valid START argument. If it does not, there are two possibilities, namely (1) the FORMAT command has a STOP argument or (2) the FORMAT command is not valid.

If the FORMAT command contains the START argument, step 157 diverts to step 158 in FIG. 3C to call the IODFMT module of FIG. 7 as described later. After the formatting has been completed, step 159 turns off or clears the Start and Stop flags before the system transfers back to step 141 in FIG. 3A. If the FORMAT command does not contain a START argument, step 160 turns off or clears the Start flag and turns on the Stop flag. If the FORMAT command includes a STOP argument that has the correct syntax, step 161 branches to step 158 in FIG. 3C. In this particular situation, however, the Start flag will be off so control passes directly to step 159. If an error exists, step 161 in FIG. 3B diverts to step 162 that turns off or clears the Stop flag and then transfers a message in step 153 to the console device 47 before returning to step 141 in FIG. 3A. Thus the operations in response to the FORMAT command will initiate a format operation through the use of the IODFMT module in FIG. 7 or will terminate a formatting operation.

Figure 3C:
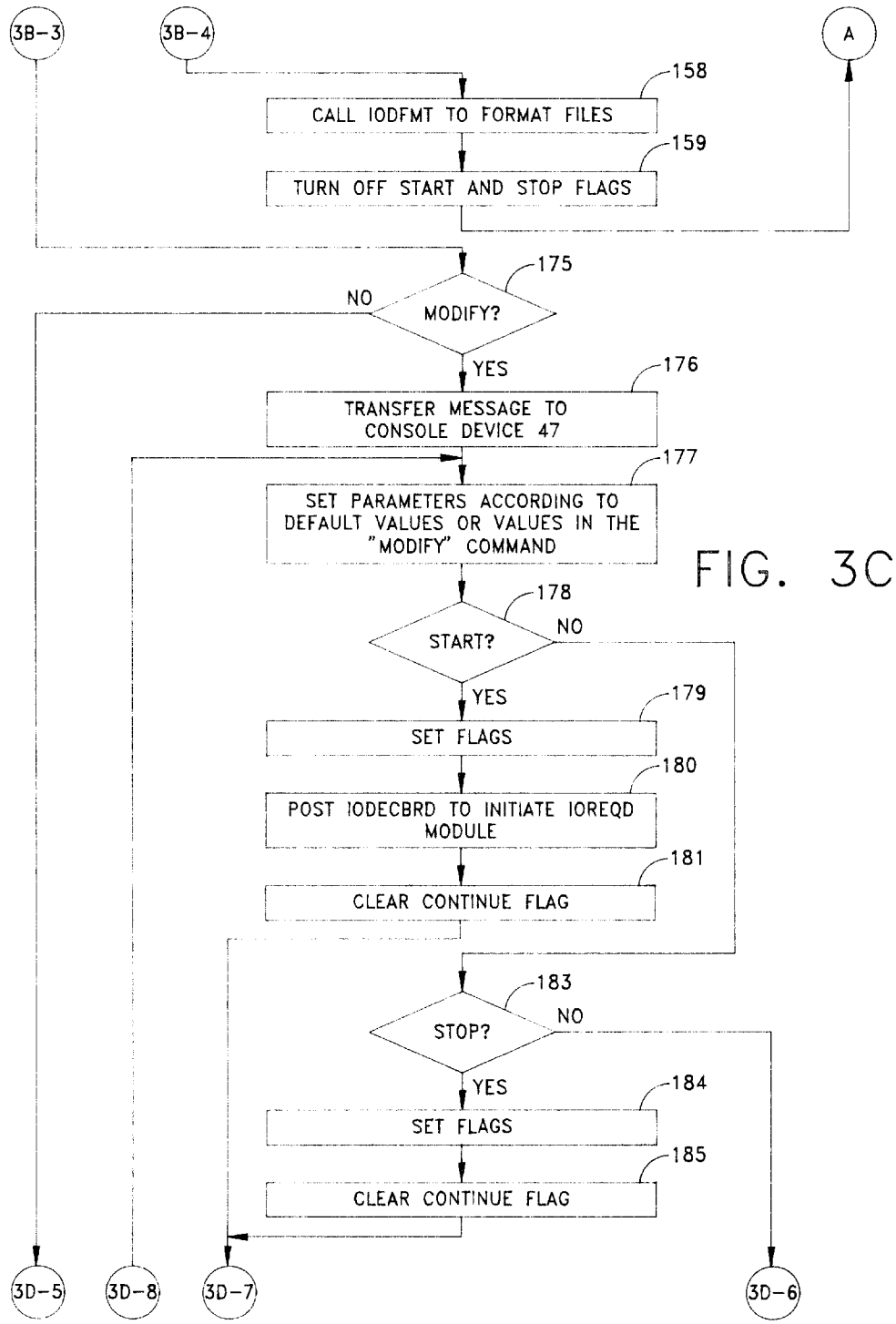

FIG. 7 depicts the IODFMT module called by step 158 in FIG. 3C. Operations begin with initialization in step 164 and the transfer of a message in step 165 to the console device 47 that indicates to the operator that formatting has begun. Step 166 establishes various format parameters. Step 167 identifies a first device and the total number of devices in the designated volume having the volume serial number prefix "vvv". Then the IODFMT enters a loop to format the physical drive by issuing a series of job requests. This continues until all procedures are complete.

As previously indicated, if the operator desires to terminate the formatting prematurely step 136 in FIG. 6 sets a Format Stop flag. Step 168 in FIG. 7 branches to step 169 to terminate the formatting operation if the Format Stop flag is set. Otherwise step 168 branches to step 170 to test the status of the device. If the device is operating properly, step 171 creates a job to format the drive using MVS utilities. When the formatting operation on a drive completes, MVS returns a code. Step 172 examines that code. If the tests are satisfactory, the system uses step 173 to identify a next device within the volume "vvv". If step 174 determines that additional devices need to be formatted, control passes back to step 168. Otherwise the IODFMT module returns to the calling routine, in particular step 159 in FIG. 3C.

If any error condition exists with respect to the device as tested in step 170 or in step 172 further operations are aborted. Aborting the job generally will include sending a descriptive message to the console device 47.

MODIFY IOD SYSTEM COMMAND

Once a volume has been selected and the device is formatted, it is possible to begin a benchmark test. This is accomplished by a MODIFY command. The MODIFY command contains a number of parameters or arguments for controlling the benchmark. Typical parameters include:

(1) a percentage of I/O operations that will be write operations (WR %), (2) a number of records to be read or written in response to each I/O request (RIO), (3) an interval during which the system will run at a current I/O rate (IORINIT) before increasing the I/O rate by an incremental amount (IODELTA) after a predetermined time (INTERVAL), (4) the number of cylinders to be used per logical device (CYL), (5) the starting location of the files on the devices (CCHHSTR), (6) the record size (BLKSIZE), and (7) one of START, STOP or DELETE parameters.

When step 175 in FIG. 3C decodes a MODIFY command, it transfers a message to the console device 47 and initiates a loop beginning with step 177 that decodes the various parameters other than the foregoing START, STOP and DELETE parameters. If the MODIFY command includes a START parameter step 178 diverts to step 179 to set a variety of flags including a Start flag and to clear Stop and Delete flags. Step 180 posts an IODECBRD to enable the IOREQD module of FIGS. 9A through 9C to initiate an operation. Then step 181 clears a Continue flag and control passes to step 182 in FIG. 3D. As the Continue flag has been cleared, control passes back to step 141 in FIG. 3A to await the receipt of another command and the posting of an IODECB. Typically this would be a MODIFY command with a STOP argument.

When a MODIFY command contains the STOP argument, step 178 in FIG. 3C branches through step 183 so step 184 sets various flags including the Stop Modify flag that will terminate any further operations. Step 185 clears the Continue flag so that control passes back through step 182 in FIG. 3D to step 141 in FIG. 3A.

If the MODIFY command does not include a STOP argument, an I/O rate timer is tested in step 186 to determine if a predetermined interval has elapsed. If it has, step 187 diverts to step 188 that sets an I/O rate timer flag to indicate the timing for posting another request. Then the I/O rate timer is cleared in step 189 to begin counting another interval and control then passes back to step 177 in FIG. 3C.

The remaining MODIFY command argument is the DELETE argument. In response to that parameter step 190 returns control to step 141 in FIG. 3A. Otherwise step 191 clears a number of flags to delete a specific device and clears the Continue flag. Step 182 then branches back to step 141 in FIG. 3A.

Thus when the operator issues a MODIFY command, the loop comprising steps 176 through 191 iterates until all parameters have been obtained and the appropriate defined action has been determined. When that has been completed, control returns to step 141 in FIG. 8 to await the receipt of a next IOD system command.

DISPLAY IOD SYSTEM COMMAND

Figure 3D:
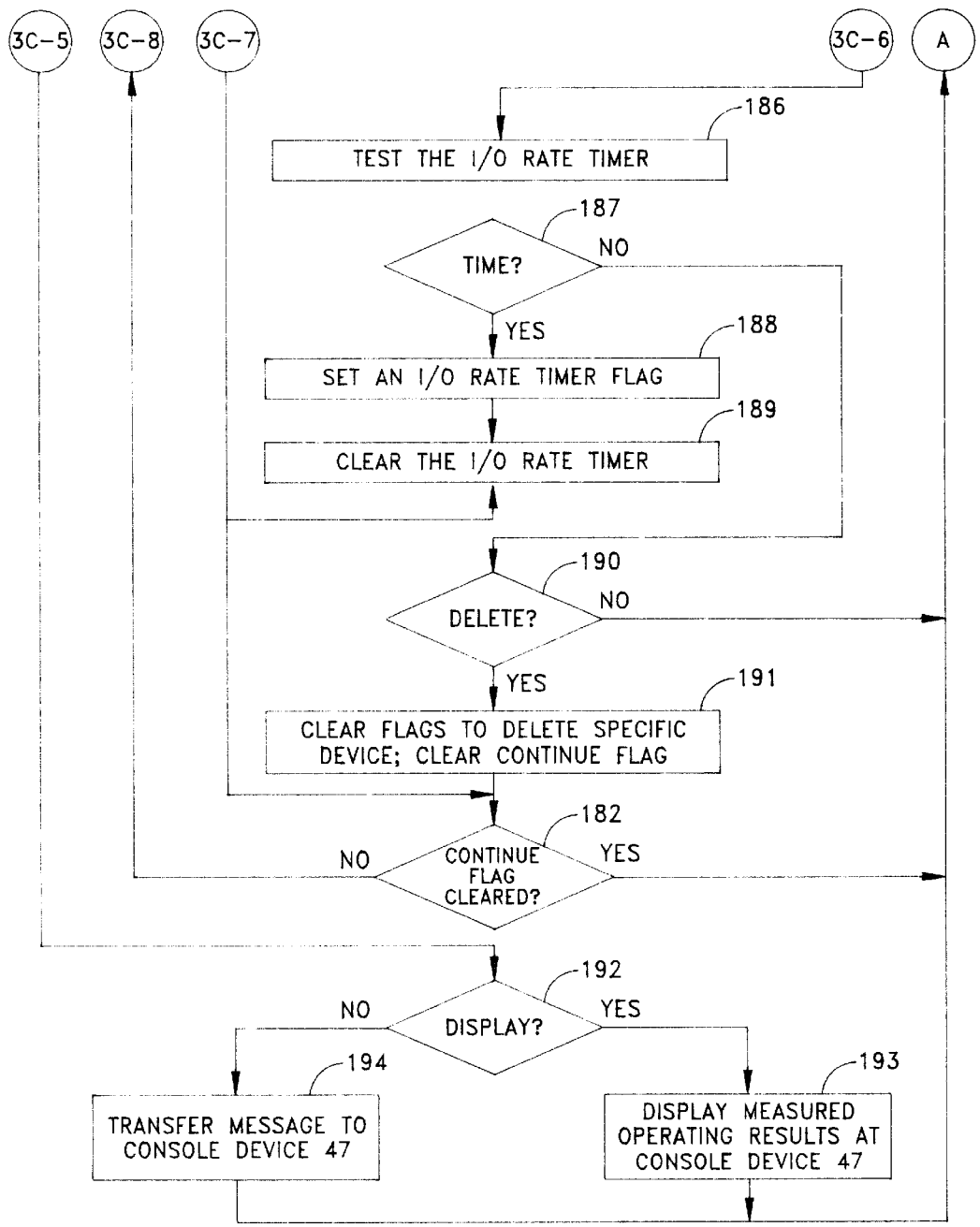

If the command from the operator is a DISPLAY command, control passes from step 175 in FIG. 3C to step 192 in FIG. 3D and the measured operating results are displayed in step 193. Otherwise the command error has occurred so step 194 transfers a corresponding error message to the console device 47.

IODREQD MODULE

The MODIFY command disclosed in FIGS. 3C and 3D establishes the environment that determines the operation of the benchmark test. However, the IODREQD module shown in FIG. 8 actually controls the benchmark test. When the IODINIT module of FIG. 4 processed step 111, the resulting ATTACH macro started the IODREQD module shown in FIG. 8. In that module step 200 represents a process for constructing a channel program and related work areas. The IODREQD module in FIG. 8 then uses step 201 to wait for the posting of an IODECBRD in response to a MODIFY command particularly as provided in step 180 of FIG. 3C. When this occurs step 202 selects an unused IOREQ object 53 from the pool 52 in FIG. 2. Step 203 in FIG. 8 builds the IOREQ object 52 with information including CCW information and sets RQONQ and RQREADY flags to an active state in step 204 to indicate that the request is about to be placed on the dispatch queue 63 and that the request is ready to be serviced. Step 205 saves an entry address for an input/output start I/O module as will become apparent later.

In step 206 the IODREQD module fills in the fields for the corresponding IODIOB structure 54 and adds the selected IOREQ object 53 to the IOREQ dispatch queue 63 in step 207. In step 208 the IODREQD module calls the IODDRVR module through one path, called a Resume driver path in this specific example, to initiate the operation set forth in FIGS. 9A through 9C. Step 209 scans the driver pool 62 for an inactive driver 60. Step 210 tests the I/O rate timer flag set in step 188 of FIG. 3D. If it is cleared, the system awaits another operation assuming step 211 finds that a Stop Modify flag is cleared. Otherwise the system branches back to step 202 to generate another request. This continues until a MODIFY command is sent with a STOP argument. As previously indicated this command will set a Modify Stop flag. Step 211 then will branch to terminate the operation, in step 212.

In essence step 210 utilizes the parameters in the MODIFY command to determine the timing for each request. In a simple command in where the rate is established by the INTERVAL, IORINIT and IODELTA parameters, step 210 makes a calculation during each interval to determine the timing for each request. Step 203 then utilizes the WR % and RIO parameters along with the CYL, CCHHSTR, BLKSIZE, DISTDEV and DISTDATA parameters in building a particular IOREQ object 53. Thus the rate at which step 208 calls the driver and at which the IOREQ objects 53 are added to the dispatch queue 63 is controlled by the IODREQD module of FIG. 8 in response to the MODIFY command parameters.

IODDRVR MODULE

After step 207 in FIG. 8, places the IOREQ object 52 on the dispatch queue 63, it calls the IODDRVR module in step 208. Regardless of the calling procedure, the IODDRVR initiates operations in step 220 by obtaining the base address for the IODCVT table 51 and the driver pool 62. Then the IODDRVR module branches according to the specific calling program. If the calling program is the IODINIT module, particularly step 111 in FIG. 4, control transfers from step 221 to FIG. 9B. Otherwise the IODSIO module of FIG. 10 will be involved so step 222 saves that module's address. If the call is from the IODREQD module, step 223 branches to step 224 to determine whether the I/O transfer in response to the request has been completed. That is, when a request for an input/output operation is set up and an IOREQ object 53 is transferred to the dispatch queue 63, an RQREADY flag is set to indicate that the request is ready for transfer under control of the MVS system by one of the drivers 60. As will become apparent, once the IODDRVR module of FIGS. 9A through 9C completes its operation with such a request, a post exit module of FIG. 11 shifts the request to an RQWAIT state. When the input/output operation has been completed, the post exit module changes the status of the request to an RQDONE state.

When the IODDRVR module is processed after an input/output operation has been completed, step 224, seeing the RQDONE state, branches to step 225 to remove the particular IOREQ object 53 from the dispatch queue 63. Then control again passes to FIG. 9B.

When the IODREQD module calls the IODDRVR module and the transfer has not been completed, step 224 branches to step 226 wherein the module clears the RQRUN flag and sets the RQWAIT flag to indicate that the corresponding IOREQ object in that IOREQ pool 52 is awaiting completion of an I/O transfer. In step 227 the system obtains the IODIOB and ECB addresses. In step 228 the event control block (ECB) is initialized for purposes known in the art.

FIG. 9B discloses that portion of the IODDRVR module that scans the dispatch queue 63 to determine whether additional IOREQ objects 53 need to be processed. As previously indicated, control branches to step 232 in FIG. 9B from step 221, 223, 225 or 231 in FIG. 9A. Initially step 232 obtains the address of the IODCVT table 51, gets a lock in step 233 and clears an active IOREQ flag in step 234. Then the system obtains the address for the head of the dispatch queue 63 in step 235 to determine whether the dispatch queue 63 is empty. If it is, step 236 branches to step 237 described later.

Whenever the dispatch queue 63 is not empty, a selected request is tested in step 238 to determine whether the RQREADY flag associated with the corresponding IOREQ object is set. If it is, step 238 branches to FIG. 9C to dispatch the request. If not, the control transfers to step 239 to determine whether another request resides on the dispatch queue 63. If there is a request, control passes from step 239 back to step 238. After all the IOREQ objects on the dispatch queue 63 with an RQREADY status have been transferred, the system frees the lock in step 237.

The steps of getting a lock and freeing a lock in the IOD system 50 constitute a serialization process to assure only appropriate status flags are changed. After the lock is freed step 240 obtains another lock to allow various driver status flags to be set in step 241 to initiate the status of the request and saves the corresponding TCB address in step 242 before freeing the lock in step 243. In step 244 the system places the associate TCB 61 on the MVS dispatcher to initiate the operation in a manner well known in the art.

When an IOREQ object has an RQREADY flag set, control passes to FIG. 9C wherein step 247 obtains a lock to clear the RQREADY and RQWAIT flags and set the RQRUN flag for the request in step 248. Thereafter the locks are released in step 249. In step 250 the address for IOREQ object in the dispatch queue 63 is obtained with the dispatch queue address being obtained in step 251. Return information then is saved in step 252 prior to branching to an IODSIO module of FIG. 10 in step 253.

Figure 10:
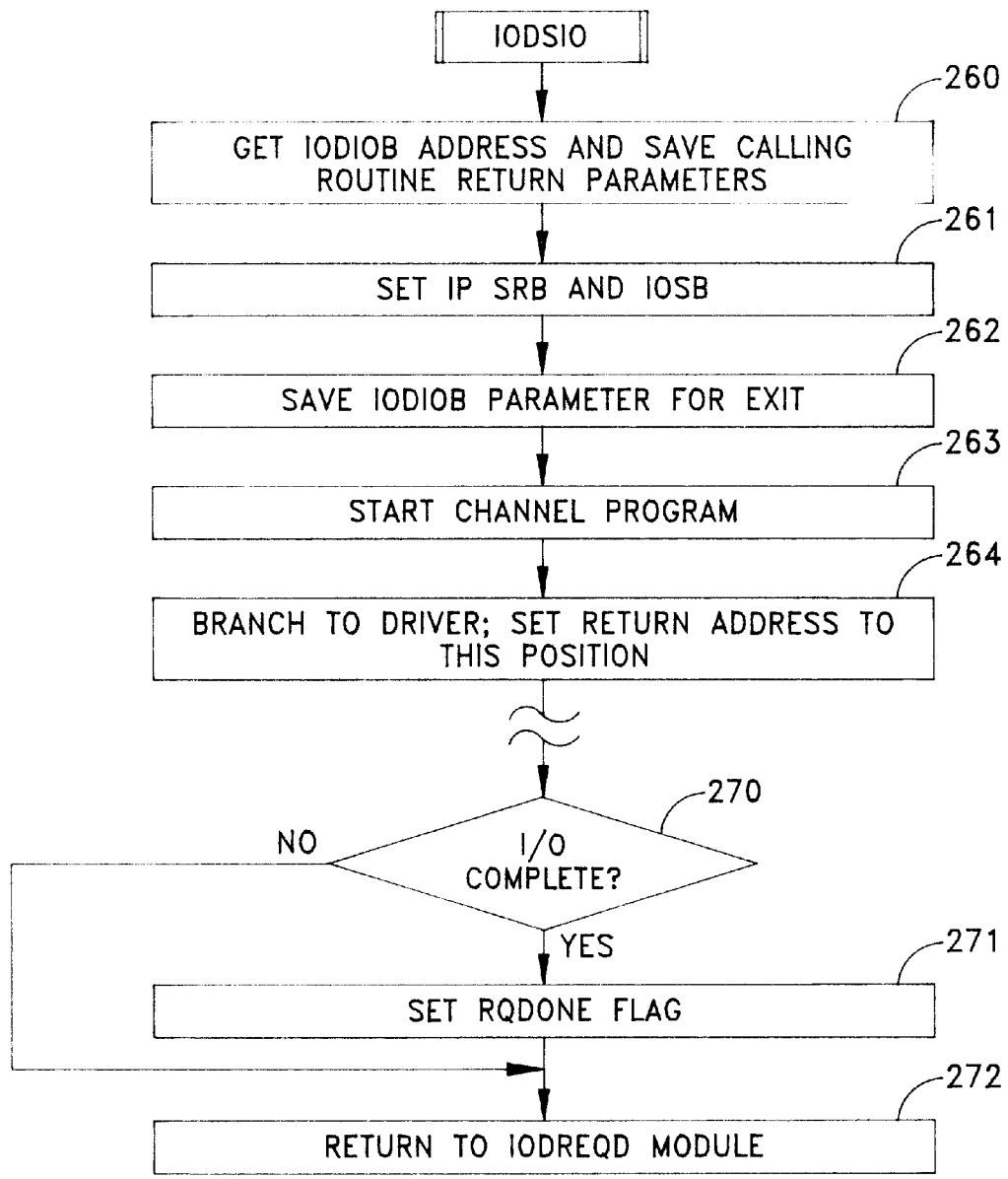
FIG. 10 is a flow diagram of an input/output program.

Thus after setting the information of FIG. 9C, control passes to FIG. 10 wherein the IODSIO module obtains the corresponding IODIOB address for the request and saves various calling routine return parameters in step 260. The module uses step 261 to set up the IOSB block 55 and SRB block 56 in step 264. Step 262 saves the IODIOB parameter for subsequent processing.

In step 263 the IODSIO module starts the channel program and then branches to the IODDRVR module in step 164. As a result the IODSIO module in FIG. 10 waits until the I/O is complete, this being represented as step 270. Once the I/O is complete, control passes to step 271 to set the RQRUN flag associated with the corresponding IOREQ object. Otherwise control transfers to step 272 whereupon control returns to the IODREQD module. As previously indicated the module then will use step 224 to branch to step 226 to clear the RQRUN flag and set the RQWAIT flag.

Thus, in response to a request being placed on the dispatch queue 63 by the IODREQD module in FIG. 8 and subsequent action by a driver according to the driver IODDRVR module in FIGS. 9A through 9C, the IODSIO module in FIG. 10 provides additional information so the MVS dispatcher can initiate the operation and transfer data from buffers within the IOD system 50 to selected positions at locations in the disk storage system 30 in FIG. 1. Moreover, the IODSIO module is called twice during a response to an input/output request. The first occurs when the MVS dispatcher acknowledges receipt of the transfer request; the second when the MVS dispatcher acknowledges completion of the transfer.

Figure 11:
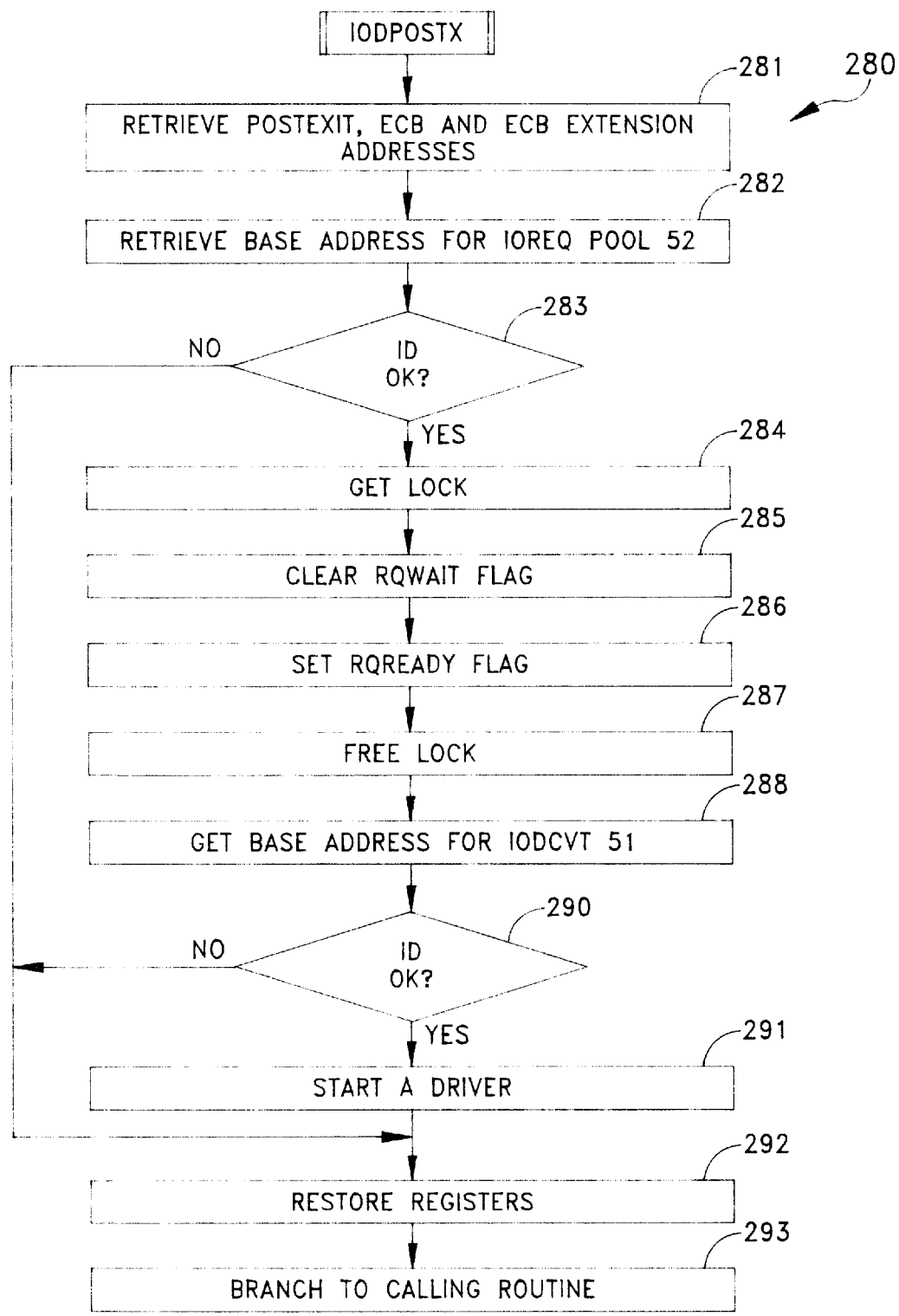
FIG. 11 is a flow diagram of a post exit program.

When the MVS dispatcher sends the second message to the IOD system 50, the system calls the IODPOSTX module 280 shown in FIG. 11. Step 281 retrieves the previously stored postexit, ECB and ECB extension addresses that contain the useful information from the MVS dispatcher. The system also retrieves the base address for the IOREQ pool 52 in step 82 and determines whether the identification of the IOREQ object to be processed is correct. If it is, step 283 branches to step 284 to obtain a lock, clear the RQWAIT flag in step 285 and set the RQREADY flag in step 286. Then the system frees the lock in step 287 and gets the base address for the IODCVT table 51 in step 288. If that address tests to be correct, step 290 branches to step 291 that starts a driver. Specifically this causes the IODDRVR module in FIGS. 9A through 9C to be invoked and to remove the corresponding IOREQ object from the dispatch queue 63. That IOREQ object then becomes available in the IOREQ pool 53. The various registers from the calling routine are then restored in step 292 and control returns to the calling routine in step 293.

When the POST EXIT module 280 of FIG. 11 has been completed, appropriate utilities in an MVS operating system having recorded various information about those transfers. Consequently all the statistics are available after the benchmark terminates. Moreover a driver of FIGS. 9A through 9C is only active for the purpose of transferring information within the IOD system 50. No driver is used during the transfer of actual data to or from the disk storage system 30 in FIG. 1. As each driver and the other modules operate only within the main storage memory 24, they execute in microsecond time frames that are insignificant in comparison with the millisecond time frames of the various input/output transfers. Consequently the IOD system 50 of FIG. 2 does not impose any undue overhead on the benchmark. As the times for the driver operation are insignificant in comparison with I/O transfer times, the number of drivers can be limited to a number corresponding to the number of central processors. A preferred number of one more than the number of central processors assures that there will always be an inactive driver available. Limiting the drivers by the number of central processors limits the number of TCB's that the MVS dispatcher must handle in effecting the various input/output transfers. Thus even at the highest transfer rates where all the central processors might be requesting service, it is still possible to operate the system with this minimal number of task control blocks. Consequently the time required to resolve contention is significantly less than in the prior art and is independent of the actual number of disk controllers or other input/output devices involved in the benchmark tests.

EXAMPLE

Figure 12:
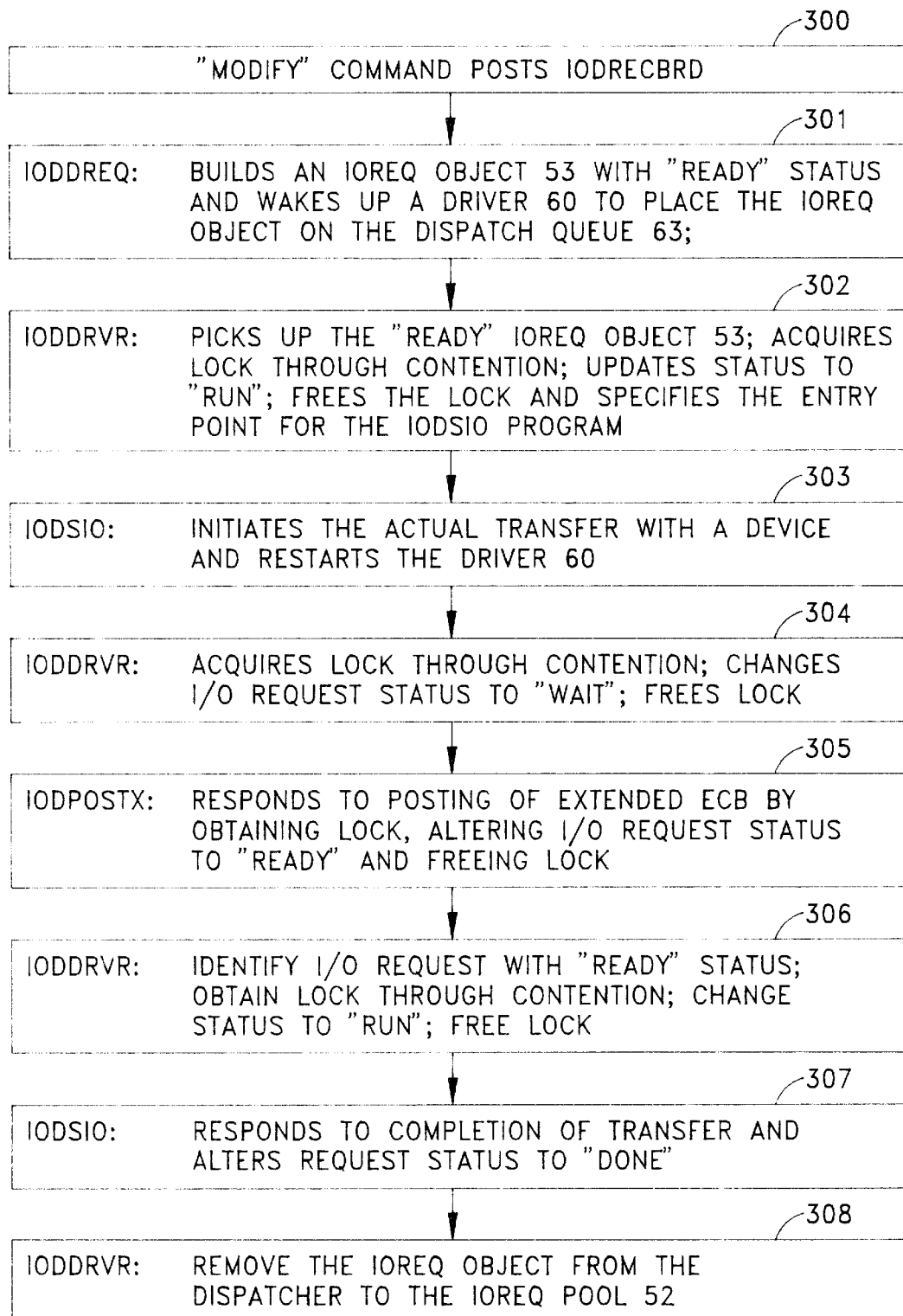
FIG. 12 depicts the flow through the programs of FIGS. 8 through 11 for a particular input/output operation.

To further understand this invention, FIG. 12 depicts a typical sequence of a data transfer generated in accordance with the foregoing modules. When the modify command is being processed, it periodically posts the IODRECBRD in step 300. The IODREQ module then builds up the IOREQ object 53 with a READY status and wakes up a driver 60 to place the IOREQ object on the dispatch queue 63 in step 301. The IODDRVR module responds to the request by picking up the ready IOREQ object 53, updating the status to a RUN status by setting a RQRUN flag and specifying the entry point for the IODSIO module in step 302. The IOSIO module then initiates an actual transfer with the device and after initiating that transfer restarts the driver 60 in step 303. The IODDRVR module then changes the IOREQ status to a WAIT status by setting an RQWAIT flag. When the MVS dispatcher responds to the TCB for the driver, it posts an extended ECB and then the IODPOSTX module uses step 305 to shift the IOREQ object to a READY status. Now the IODDRVR module in step 306 identifies the IOREQ object with the READY status and changes the status to a RUN status in step 306. When the IODSIO module completes the transfer, it responds by shifting the IOREQ object status to a DONE status in step 307. The IODDRVR module removes the IOREQ object from the dispatcher to the IOREQ pool 52 in step 308 so the IOREQ object is now available.

Thus there has been described a benchmark test that is particularly useful in the evaluation of large capacity disk storage systems. This benchmark enables the quantification of data at extremely high data rates without imposing any undue overhead on the benchmark that could skew the results. As previously indicated this is accomplished by establishing a pseudo-operating system, like the IOD system specifically described above, for limiting the number of tasks that must be executed by the central processors of the attached computer system. In the prior art the number of tasks has been directly related to the number of individual devices, i.e., logical volumes in a large scale disk storage system. In accordance with this invention the number of tasks is related to the number of central processors and independent of the number of devices.

This invention has been described in terms of a specific embodiment. Many of the functions that have been disclosed have been disclosed in a particular order. It will be apparent that many changes from the order can be incorporated in a workable benchmark system. Therefore, it is the intent of the appended claims to cover all such variations and modifications as come within the true spirit and scope of this invention.

What is claimed as new and desired to be secured by Letters Patent of the United States is:

1. A method for performing a benchmark in the operation of a disk array storage system including a plurality of controllers and disk devices organized as devices for operation with a plurality of central processors and a main storage unit under the control of a main operating system for controlling multiple virtual processes, said method comprising the steps of:

A) initializing a pseudo-operating system with a pool of machine drivers, a pool of machine request objects, a pool of device tables, and a dispatcher queue, B) responding to a benchmark initialization command by generating an ordered sequence of input/output requests to a specific device, C) responding to each input/output request by:
  i) building a request object using information from the request and the device table for the device,
  ii) transferring the request object to the dispatcher queue,
  iii) activating a driver from the driver pool to communicate with the main operating system thereby to effect the transfer request to the main operating system,
  iv) effecting the transfer through the main operating system, and
  v) inactivating the driver with respect to the transfer request, and D) terminating the benchmark.

2. A method as recited in claim 1 wherein the main operating system collects statistics representing the response of the system to transfer requests, said method comprising the additional step of displaying the collected statistics for evaluating system performance.

3. A method as recited in claim 1 wherein said method includes the step of selecting, upon completion of a transfer in response to an input/output request, an inactive driver to remove the request object assigned to input/output request from the dispatcher queue whereby the request object becomes available for use with another input/output request.

4. A method as recited in claim 1 additionally comprising the step of responding to the receipt of a corresponding driver status by changing the corresponding request object to an inactive state whereby the request object is available for receiving a subsequent input/output request.

5. A method as recited in claim 4 wherein said memory defining step includes defining the number of control processors and defining the plurality of drivers to correspond to the number of central processors.

6. A method as recited in claim 4 wherein said driver plurality is equal to n+1 wherein n is the defined number of central processors.

7. A method as recited in claim 4 wherein said driver plurality defining step defines a plurality that is less than or equal to n+1 wherein n is the defined number of central processors.

8. A method as recited in claim 7 wherein the disk array storage device is divided into logical volumes with logical volume identifications that constitute the devices, said method additionally comprising the step of responding to another command by selecting the devices having a predetermined identification for use with the benchmark, said initializing of device tables being limited to the device tables for devices in the selected logical volume.

9. A method as recited in claim 8 additionally comprising the step of responding to another command by formatting each device.

10. A method as recited in claim 7 wherein said method includes the step of terminating the benchmark in response to another command.

11. A system for testing the operation of a data processing system including an operating system for controlling the transfers of data amount a plurality of central processors, a main memory and a plurality of input/output devices wherein the operating system responds to data transfer requests on a dispatch queue, said system comprising:
    A) command interpreter means for generating a sequence of input/output requests in response to a testing command that identifies characteristics of a data transfer testing procedure,
    B) dispatch queue means for storing input/output request objects having a data structure that corresponds to the data structures required by the operating system,
    C) a plurality of drivers, each driver having one of a plurality of states including an active state and an inactive state, the number of drivers corresponding to the number of central processors,
    D) means responsive to an input/output request for selecting one of the plurality of drivers having an inactive state to generate an input/output request data structure defining an input/output operation for storage in said dispatch queue means in an active state.

12. A system as recited in claim 11 wherein the data processing system includes n central processors, said system including a plurality of n+1 drivers.

13. A system as recited in claim 12 additionally comprising means responsive to the transfer of an input/output request data structure to said dispatch queue means for shifting the corresponding driver to an inactive state.

14. A system as recited in claim 13 wherein the method additionally comprises, upon completion of a transfer in response to an input/output request, selecting an inactive driver to remove the request object assigned to input/output request from the dispatcher queue whereby the request object becomes available for use with another input/output request.

15. A system as recited in claim 13 wherein said memory defining step includes defining the number of control processors and defining the plurality of drivers to correspond to the number of central processors.

16. A system as recited in claim 13 wherein said driver plurality is equal to n+1 wherein n is the defined number of central processors.

17. A method for monitoring the performance of at least one input/output device and an associated controller that constitute elements of a data processing system with a central processor, associated memory and main operating system, the controller responding to predetermined controller commands from the central processor by completing a transfer and generating a status response, said method comprising the steps of:
    A) defining in the memory:
        i) a plurality of request objects, each request object being characterized by one of active and inactive states,
        ii) a dispatcher queue for storing predetermined controller commands, and
        iii) a plurality of drivers, each driver being characterized by having one of active and inactive states;
    B) generating a sequence of input/output requests in response to a predetermined controller command; and
    C) responding to each input/output request by:
        i) selecting an inactive request object for change to an active state,
        ii) generating a request in the inactive request object in response to the input/output request,
        iii) changing an inactive driver to an active driver for transferring the identified request object to the dispatcher queue to enable a transfer with the designated input/output device, and
        iv) changing the selected driver to an inactive state whereby the driver is available for other actions.

18. A method as recited in claim 17 additionally comprising the step of responding to the receipt of a corresponding controller status response by changing the corresponding request object to an inactive state whereby the request object is available for receiving a subsequent input/output request.

19. A method as recited in claim 17 wherein the method additionally comprises, upon completion of a transfer in response to an input/output request, selecting an inactive driver to remove the request object assigned to input/output request from the dispatcher queue whereby the request object becomes available for use with another input/output request.

20. A method as recited in claim 18 wherein said memory defining step includes defining the number of control processors and defining the plurality of drivers to correspond to the number of central processors.

21. A method as recited in claim 20 wherein said driver plurality is equal to n+1 wherein n is the defined number of central processors.

22. A method as recited in claim 20 wherein said driver plurality defining step defines a plurality that is less than or equal to n+1 wherein n is the defined number of central processors.

23. A method as recited in claim 20 wherein said memory definition includes defining a device table for each controller that defines parameters of that controller.

24. A method as recited in claim 20 wherein the main operating system operates in response to task control blocks and wherein each said driver has a task control block attached thereto.

* * * * *